(12) United States Patent
Foo et al.

(10) Patent No.: US 11,043,020 B2
(45) Date of Patent: *Jun. 22, 2021

(54) DECODER UNIT FOR TEXTURE DECOMPRESSION

(71) Applicant: Imagination Technologies Limited, Kings Langley (GB)

(72) Inventors: Yoong Chert Foo, London (GB); Kenneth Rovers, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,178

(22) Filed: Mar. 2, 2020

(65) Prior Publication Data

US 2020/0202607 A1 Jun. 25, 2020

Related U.S. Application Data

(63) Continuation of application No. 15/965,882, filed on Apr. 28, 2018, now Pat. No. 10,636,195.

(30) Foreign Application Priority Data

Apr. 28, 2017 (GB) ...................................... 1706858

(51) Int. Cl.
*G06T 15/04* (2011.01)
*G06T 9/00* (2006.01)
(Continued)

(52) U.S. Cl.
CPC ................ *G06T 15/04* (2013.01); *G06T 9/00* (2013.01); *G06T 11/001* (2013.01); *H04N 19/436* (2014.11); *H04N 19/44* (2014.11)

(58) Field of Classification Search
CPC ....... G06T 15/04; G06T 11/001; G06T 9/001; H04N 19/44; H04N 19/436
See application file for complete search history.

(56) References Cited

U.S. PATENT DOCUMENTS 10,636,195 B2 *  4/2020  Foo ..................... H04N 19/436
2007/0008333 A1  1/2007  Xu
(Continued)

FOREIGN PATENT DOCUMENTS

GB           2382736 A        6/2003
WO       2011/065886 A1      6/2011

OTHER PUBLICATIONS

Ellis et al., "ASTC Specification Media Processing Division," ARM Limited Jul. 2012.
(Continued)

*Primary Examiner* — Antonio A Caschera
(74) *Attorney, Agent, or Firm* — Potomac Law Group, PLLC; Vincent M DeLuca

(57) ABSTRACT

A decoder unit is configured to decode a plurality of texels in accordance with a texel request, the plurality of texels being encoded across one or more blocks of encoded texture data each encoding a block of texels, and includes a first set of one or more decoders, each of the first set of decoders being configured to decode n texels from a single received block of encoded texture data; a second set of or more decoders, each of the second set of decoders being configured to decode p texels from a single received block of encoded texture data, where p<n; and control logic configured to allocate blocks of encoded texture data to the decoders in accordance with the texel request.

20 Claims, 14 Drawing Sheets

(51) Int. Cl.
*H04N 19/436* (2014.01)
*H04N 19/44* (2014.01)
*G06T 11/00* (2006.01)

(56) References Cited

U.S. PATENT DOCUMENTS

2009/0315908 A1 12/2009 Comparan et al.
2012/0281915 A1 11/2012 Strom
2017/0078677 A1 3/2017 Park et al.

OTHER PUBLICATIONS

Nystad et al., "Adaptive Scalable Texture Compression," High Performance Graphics, Eurographics Association, 2012.
(*Note: copies of NPL in parent apn).

* cited by examiner

| 0/4 | 2/4 | 1/4 | 2/4 |
| --- | --- | --- | --- |
| 1/4 | 1/4 | 2/4 | 0/4 |
| 3/4 | 0/4 | 0/4 | 4/4 |
| 0/4 | 0/4 | 3/4 | 4/4 |

DECODER UNIT FOR TEXTURE DECOMPRESSION

CROSS-REFERENCE TO RELATED APPLICATIONS AND CLAIM OF PRIORITY

This application is a continuation under 35 U.S.C. 120 of copending application Ser. No. 15/965,882 filed Apr. 18, 2018, which claims foreign priority under 35 U.S.C. 119 from United Kingdom Application No. 1706858.6 filed Apr. 28, 2017.

This invention relates to a decoder unit for decoding a plurality of texels (texture elements) encoded across one or more blocks of encoded texture data.

BACKGROUND

Textures are used heavily within the field of computer graphics processing. Textures may be used to represent surface properties, illumination (e.g. within the environment of a scene being imaged) or to apply surface detail to an object being rendered. Textures may require relatively large amounts of memory storage, and texture accesses can contribute a significant proportion of a graphics device's memory bandwidth. As such, it is often desirable to compress texture data.

There exist various texture compression schemes, or formats. One class of texture compression schemes are known as block-based schemes. In a block based scheme, the compressed texture data is encoded in a series of data blocks of a given size (e.g. 64 or 128 bits). Each data block encodes the texture data for a particular block of texels of the texture (e.g. a 2×2, or 4×4 block of texels). Examples of block-based texture compression schemes include, for example, PowerVR Texture Compression (PVRTC), PVRTC2, S3 Texture Compression (S3TC, also known as BC1, BC2 and BC3); Adaptive Scalable Texture Compression (ASTC); Ericsson Texture Compression (ETC); ETC2; EAC; 3Dc (also known as BC4 and BC5); BC6 and BC7.

It is often desirable fora graphics system to decode a plurality of texels simultaneously, or in parallel, in order to improve performance of the system when rendering a scene. A further motivation arises from the fact that, in many graphics applications, texels to be decoded can be grouped together into groups of multiple texels. For example, in many graphics pipelines the texture colour to be applied to a particular pixel being processed is obtained by filtering a plurality of neighbouring texels mapped to that pixel. Thus, when processing the pixel, multiple texels may need to be decoded to be used in the filtering operation to obtain the final texture colour for that pixel. Some graphics systems may additionally process multiple pixels concurrently, each of which may require multiple texels to be decoded as part of a filtering operation.

An effective way of handling this demand for decoding multiple texels (from a performance standpoint) is to simply have a requisite number of decoders each operating in parallel such that the total number of texels that can be decoded in parallel matches or exceeds the number of texels in a given texel request. However, this approach suffers from the drawback of high hardware requirements, which may manifest as large circuitry area. For example, simply having 'n' decoders operate in parallel in order to handle the texture requests at a desired performance level results in decoder circuitry that is commensurately 'n' times as large.

SUMMARY OF INVENTION

According to the present invention there is provided a decoder unit configured to decode a plurality of texels in accordance with a texel request, the plurality of texels being encoded across one or more blocks of encoded texture data each encoding a block of texels, the decoder unit comprising:

a first set of one or more decoders, each of the first set of decoders being configured to decode n texels from a single received block of encoded texture data;
a second set of or more decoders, each of the second set of decoders being configured to decode p texels from a single received block of encoded texture data, where p<n; and
control logic configured to allocate blocks of encoded texture data to the decoders in accordance with the texel request.

Each of the second set of one or more decoders may be configured to decode a single texel from a received block of encoded texture data.

Each of the one or more second set of decoders may be configured to decode two texels from a received block of encoded texture data.

Each of the first set of decoders may be configured to decode four texels from a single received block of encoded texture data.

The ratio of the number of decoders in the first set to the number of decoders in the second set may be 4:2.

The ratio of the number of decoders in the first set to the number of decoders in the second set may be 4:1.

The control logic may be configured to, in response to a texel request indicating a 2×2 sub-block of texels encoded across more than one block of encoded texture data is to be decoded, allocate at least one block of encoded texture data to two decoders of the second set, each of said more than one blocks of encoded texture data encoding at least one texel of the 2×2 sub-block.

The control logic may be configured to allocate one block of encoded texture data that encodes two texels of the 2×2 sub-block to two decoders of the second set in response to the texel request indicating the 2×2 sub-block overlaps the edges of two adjacent texel blocks.

The control logic may be configured to allocate two different blocks of encoded texture data encoding two different texels of the 2×2 sub-block to two decoders of the second set in response to the texel request indicating the 2×2 block overlaps the corners of four adjacent texel blocks.

The control logic may be configured to allocate a block of encoded data different to the blocks allocated to the decoders of the second set to a decoder of the first set that encodes at least one other texel of the 2×2 sub-block.

Each encoded block of texture data may be encoded according to an Adaptable Scalable Texture Compression (ASTC) format.

Each of the first set of decoders may comprise:
a parameter decode unit configured to decode configuration data for the received block of texture data;
a colour decode unit configured to decode colour endpoint data for n texels of the received block in dependence on the configuration data;
a weight decode unit configured to decode interpolation weight data for each of the n texels of the received block in dependence on the configuration data; and
at least one interpolator unit configured to calculate a colour value for each of the n texels of the received block using the interpolation weight data for that texel and a pair of colour endpoints from the colour endpoint data;
wherein at least one of the parameter decode unit, colour decode unit and weight decode unit are configured to decode intermediate data from the received block that is common to the decoding of the texels of that block and to use that decoded intermediate data in the decoding of at least two of the n texels from the received block of texture data.

The at least one of the parameter decode unit, colour decode unit and weight decode unit may be configured to use the same data as part of the decoding of each of the n texels.

A first portion of the configuration data may be common to the decoding of the n texels, and the weight decode unit is configured to use that first portion of configuration data for decoding the interpolation weight data for each of the n texels.

The first portion of configuration data may comprise at least one of: a weight grid size specifying the dimensions of a weight grid; and weight ranges specifying the range of values occupied by weights of the grid.

A second portion of the configuration data may be common to the decoding of the texels of the received block, and the colour decode unit may be configured to use that second portion of configuration data for decoding the colour endpoint data for each of the n texels.

The second portion of configuration data may comprise colour endpoint mode data that specifies how to convert a set of colour endpoint values into a pair of colour endpoints.

The parameter decode unit may be configured to: decode intermediate configuration data from the received block of texture data as part of decoding the configuration data; and use that same intermediate configuration data to decode a partition index for each of the n texels.

The intermediate configuration data may comprise at least one of: a partition pattern index; and a partition number.

The colour decode unit may be configured to: decode intermediate colour data from the received block of texture data as part of decoding the colour endpoint data that is common to the decoding of the texels of that block; and use that intermediate colour data to decode the colour endpoint data for each of the n texels.

The intermediate colour data may comprises the size of the data within the block used to represent the colour endpoints.

The intermediate colour data may further comprise colour endpoint mode data that specifies how to convert a set of colour endpoint values into a pair of colour endpoints.

The colour decode unit may be configured to decode a set of colour values and to convert those values into a pair of colour endpoints for each of the plurality of texels, the colour decode unit being configured to use at least one of the colour endpoints for two or more of the n texels.

The weight decode unit may be configured to: decode intermediate weight data from the received block of texture data as part of decoding the interpolation weight data that is common to the texels of that block; and use that data to decode the interpolation weight data for each of the n texels.

The intermediate data may comprise the size of the data within the block used to represent the interpolation weight data.

The texels represented by the block may be partitioned into $n_p$ partitions, and the decoder may comprise $n_p$ interpolators each configured to calculate a colour value for a subset of texels in a respective partition using the interpolation weight data for that texel and a respective pair of colour endpoints from the colour endpoint data.

The blocks of texture data may be encoded according to one of the following texture compression formats: S3TC; PVR-TC; PVR-TC2; ASTC; ETC1; ETC2; EAC; 3Dc; and BC1-BC5.

According to a second aspect of the present disclosure there is provided a method of decoding a plurality of texels in accordance with a texel request, the texels being encoded across one or more blocks of encoded texture data each encoding a block of texels, the method comprising: allocating blocks of encoded texture data to decoders of a first and second set of one or more decoders in accordance with the texel request, wherein each of the first set of decoders is configured to decode n texels from a single received block of encoded texture data, and each of the second set of decoders is configured to decode p texels from a single received block of encoded texture data, where p<n.

There may be a decoder unit configured to perform the method above.

The decoder unit may be embodied in hardware on an integrated circuit.

There may be a method of manufacturing a decoder unit as described herein.

There may be provided computer readable code configured to cause the methods as described herein to be performed.

There may be provided a computer readable storage medium having encoded thereon the computer readable code.

There may be provided an integrated circuit definition dataset that, when processed in an integrated circuit manufacturing system, configures the integrated circuit manufacturing system to manufacture a decoder unit as described herein.

There may be provided a non-transitory computer readable storage medium having stored thereon a computer readable description of an integrated circuit that, when processed in an integrated circuit manufacturing system, causes the integrated circuit manufacturing system to manufacture a decoder unit as described herein.

There may be an integrated circuit manufacturing system configured to manufacture decoder unit as described herein.

There may be provided integrated circuit manufacturing system comprising:
 a non-transitory computer readable storage medium having stored thereon a computer readable description of an integrated circuit that describes a decoder unit as described herein;
 a layout processing system configured to process the integrated circuit description so as to generate a circuit layout description of an integrated circuit embodying the decoder unit as described herein; and
 an integrated circuit generation system configured to manufacture decoder unit according to the circuit layout description.

BRIEF DESCRIPTION OF DRAWINGS

The present invention will now be described by way of example with reference to the accompanying drawings. In the drawings.

DETAILED DESCRIPTION

The present disclosure is directed to a decoder unit configured to decode a plurality of texels that are encoded across one or more blocks of encoded texture data. Each block of encoded texture data may encode a block of texels of a texture. Where a texture decoder is configured to decode a plurality of texels, the texels to be decoded could be in the form of a set of texel sub-blocks. Each of those texel sub-blocks may be contiguous with other texel sub-blocks or non-contiguous. Some of the texel sub-blocks may overlap with other texel sub-blocks. Different texel sub-blocks may be encoded by different encoded texture data blocks, and/or one or more texel sub-blocks may be part encoded by two or more texture data blocks. That is, a texel sub-block to be decoded by the decoder may be located such that it overlaps the edges of two (or four) texture data blocks that were each encoded as separate blocks of texels. In this circumstance, the texel sub-block may be encoded by two or more (e.g. four) respective data blocks. The possible overlaps between a texel sub-block and a block of texels encoded by a block of texture data are illustrated in FIGS. 1A-1C.

Figure 1A:
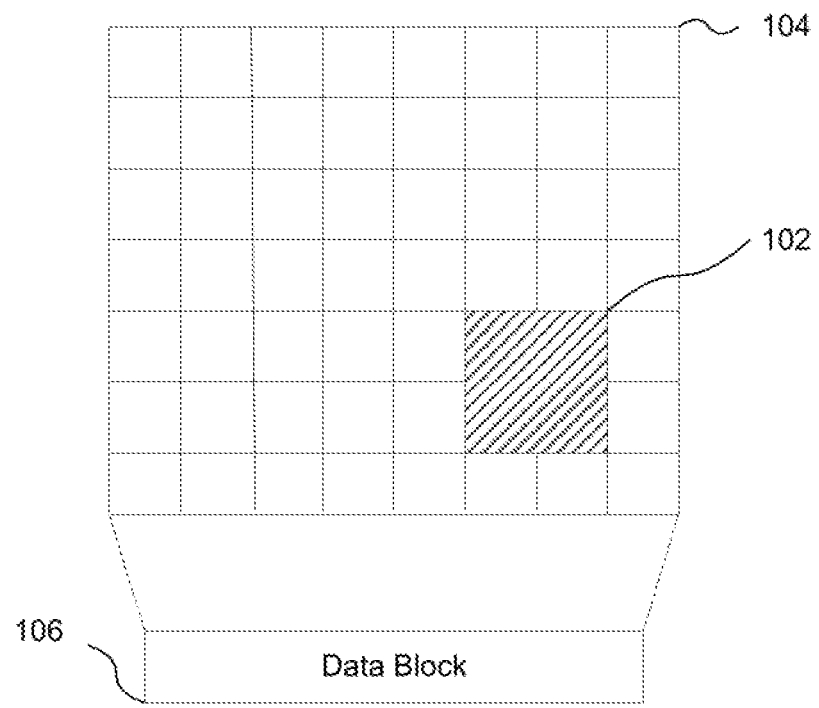
FIG. 1A shows a texel sub-block to be decoded as part of a texel request that falls wholly within a texel block encoded by a data block.
Figure 1B:
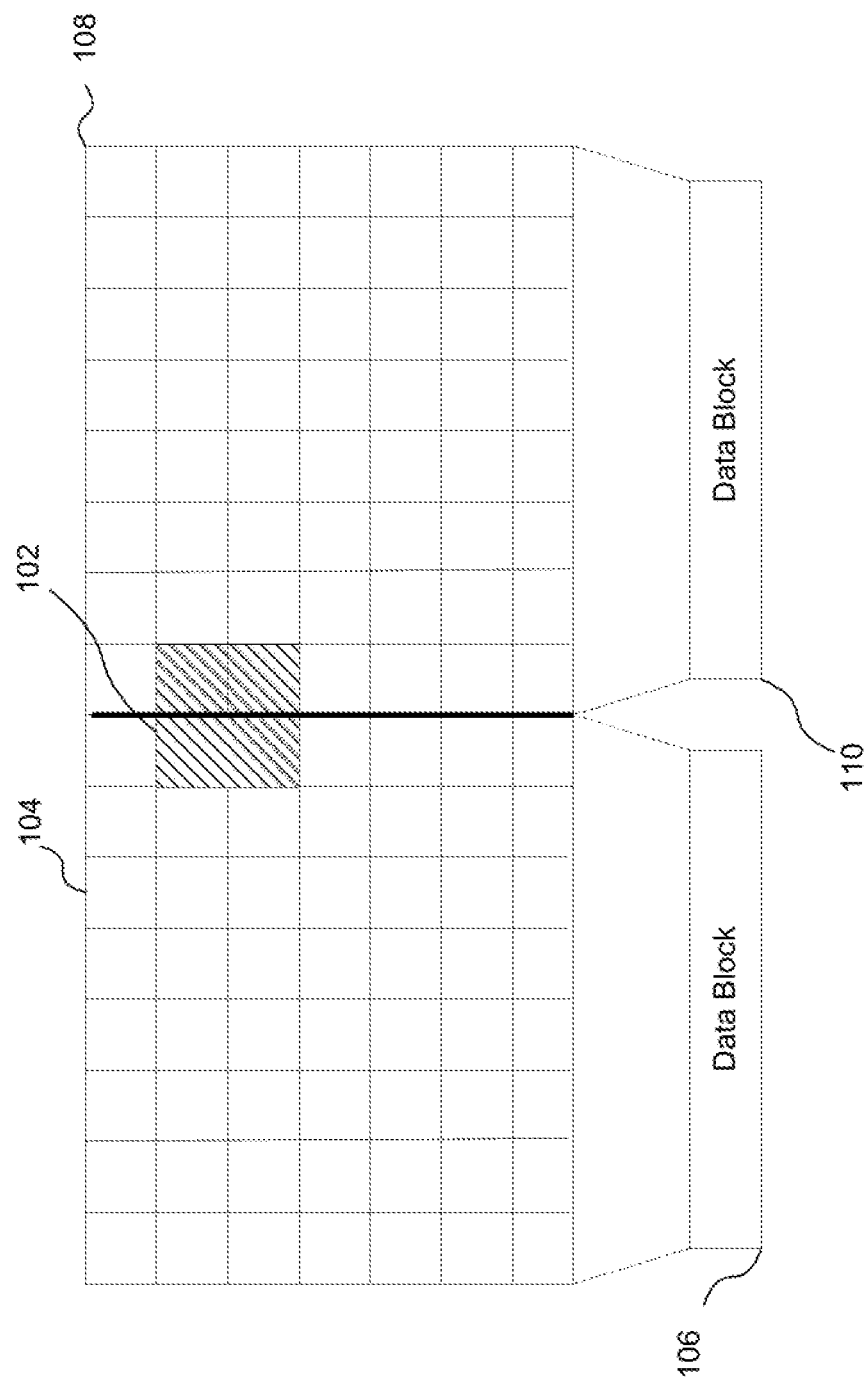
FIG. 1B shows a texel sub-block to be decoded as part of a texel request that overlaps the edges of two adjacent texel blocks.
Figure 1C:
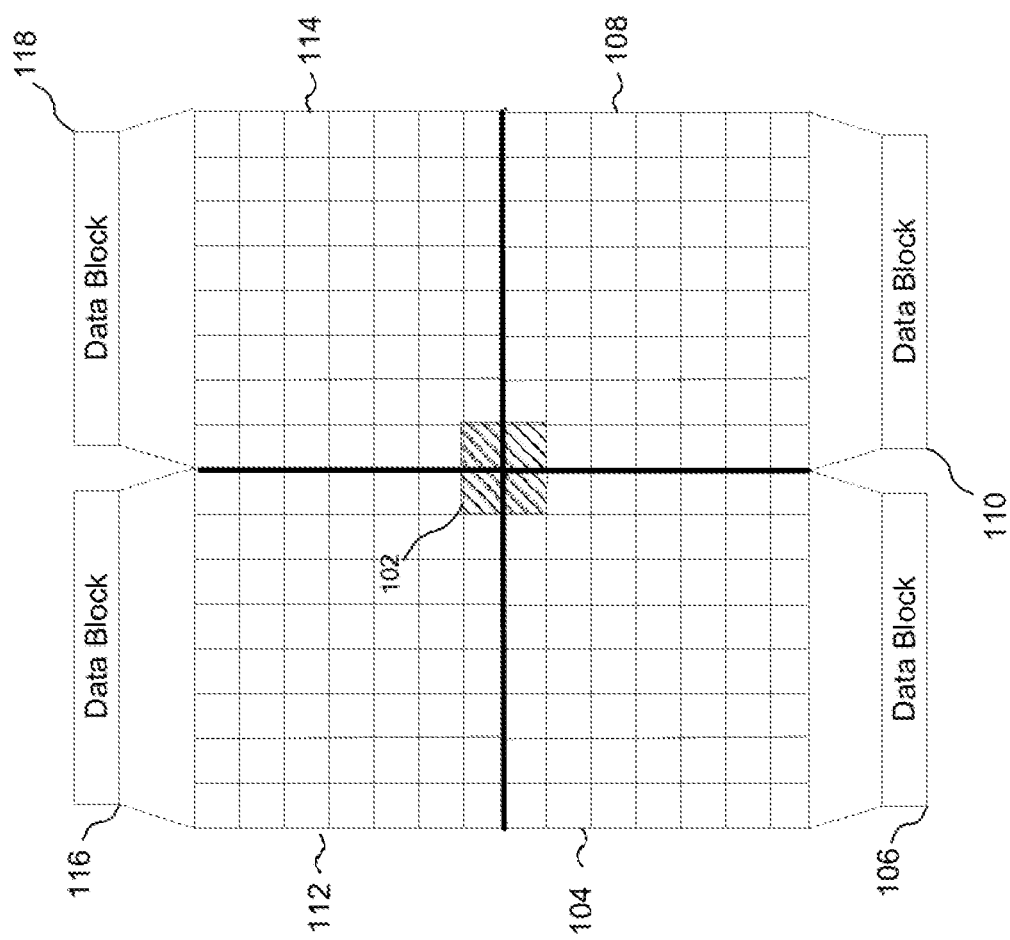
FIG. 1C shows a texel sub-block to be decoded as part of a texel request that overlaps the corners of four adjacent texel blocks.

FIG. 1A shows an example where a texel sub-block 102 to be decoded falls entirely within the block of texels 104 encoded in a single block of encoded texture data, illustrated schematically at 106. That is, FIG. 1A illustrates the case where a texel sub-block to be decoded is encoded in a single block of encoded texture data. FIG. 1B shows an example where the texel sub-block 102 to be decoded overlaps the edges of neighbouring blocks of texels 104 and 108 encoded in different blocks of texture data 106 and 110. That is, in FIG. 1B the sub-block of texels is part encoded in the encoded texture data block 106 and part encoded by the encoded texture data block 110. Finally, FIG. 1C shows an example where the texel sub-block 102 overlaps the corners of neighbouring texel blocks 104, 108, 112 and 114, encoded by different texture data blocks 106, 110, 116 and 118 respectively. Thus in the example shown in FIG. 1C the texel sub-block is part encoded by each of the texture data blocks 106, 110, 116 and 118. In each of these examples the texel block encoded by a block of data has dimensions of 8×8 texels, and the sub-block has dimensions of 2×2 texels. These values have been chosen merely for illustration.

Though the texel sub-blocks are shown here as rectangular sub-blocks, it will be understood that the texel sub-blocks may have other shapes. The texel sub-blocks could be irregular shapes, for example. If the texel sub-blocks are irregular shapes, it may be possible for a sub-block to overlap an odd number of neighbouring texel blocks (for example, an irregular-shaped texel sub-block could overlap three neighbouring texel blocks). Furthermore, though the textures illustrated in FIG. 1 and in other examples described herein are shown and described as two-dimensional textures, it will be appreciated that the techniques described herein are applicable to three-dimensional textures (e.g. as supported by ASTC). In the case of a 3D texture, it is possible for a texture sub-block to overlap up to eight neighbouring texel blocks.

The decoder unit comprises a first set of one or more decoders and a second set of one or more decoders. The decoder(s) of the first set are configured to decode different numbers of texels in parallel from a received block of texture data than the decoder(s) of the second set. The decoder further includes control logic to allocate blocks of encoded texture data to the decoders of the first and second sets in accordance with a texel request. By having at least two sets of decoders that decode different numbers of texels from a block of texture data, where the decoders of at least one set are capable of decoding multiple texels in parallel, the decoder unit may benefit from high performance levels without commensurate increases in hardware requirements, or circuitry size. This is in part because a multi-decoder may be capable of decoding multiple texels in parallel with greater hardware efficiency compared to operating the multiple single-output decoders in parallel. This will be illustrated with respect to the various examples described below.

In the examples that follow, the decoder unit contains two sets of decoders. This is for the purpose of illustration only and it will be appreciated that in other examples the decoder unit may contain more than two sets of decoders, where the decoders of each set are capable of decoding different numbers of texels in parallel.

Figure 2:
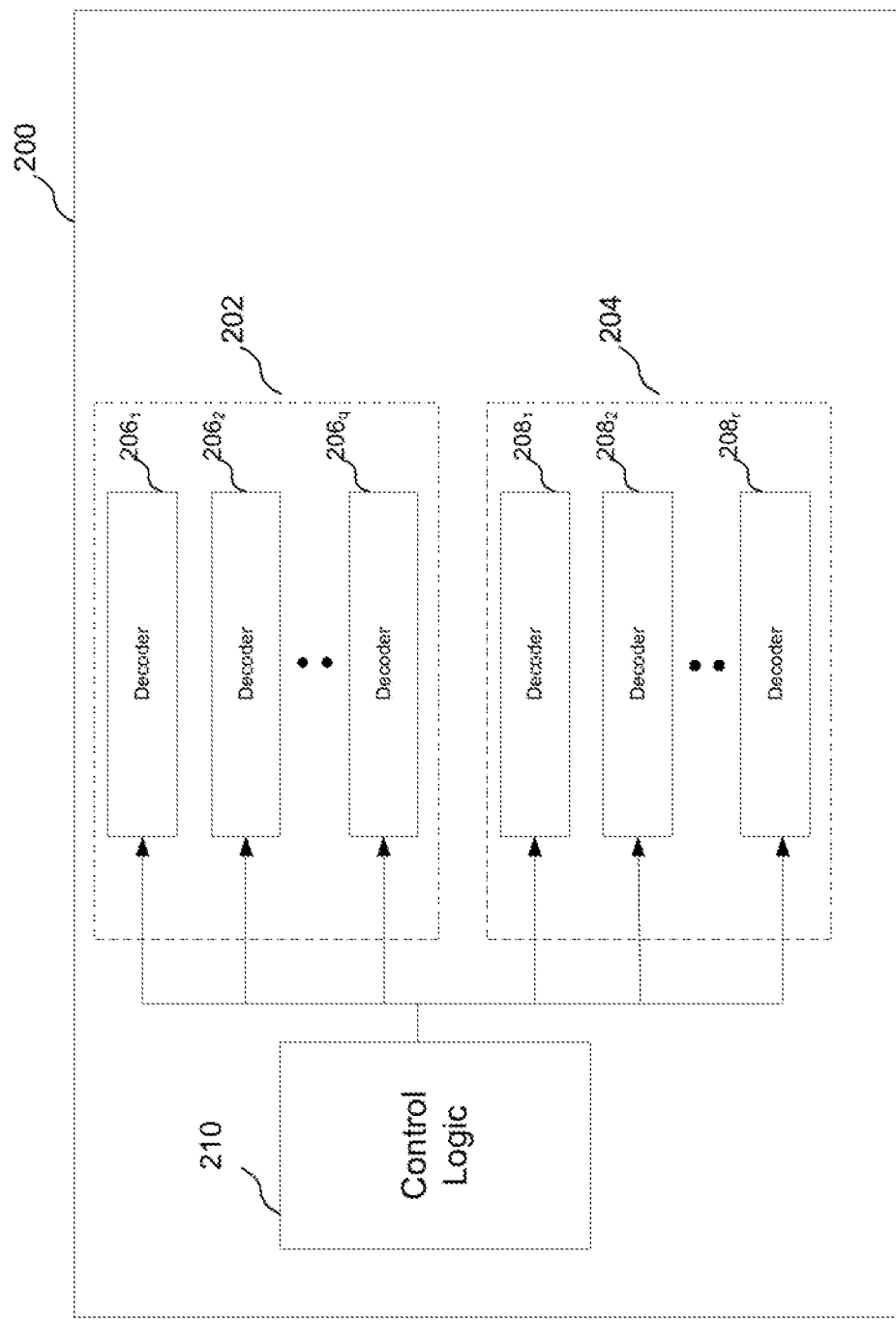
FIG. 2 shows an example of a decoder unit for decoding a plurality of texels indicated in a texel request.

FIG. 2 shows a decoder unit 200. The decoder unit 200 comprises a first set of decoders denoted generally at 202, and a second set of decoders denoted generally at 204. The first set of decoders is formed of q decoders $206_{1,2,\ldots,q}$, and the second set of decoders is formed of r decoders $208_{1,2,\ldots,r}$. In general, the first set is formed of one or more decoders (i.e. q≥1) and the second set is formed of one or more decoders (i.e. r≥1). The decoder further comprises control logic 210 coupled to each of the decoders of the first and second set.

Each of the first set of decoders 202 is configured to decode n texels from a single received block of encoded texture data, and each of the second set of decoders 204 is configured to decode p texels from a single received block of texture data, where p<n. Each of the decoders of the second set decodes at least one texel from a data block, and so it follows that each of the decoders of the first set is a multi-decoder; that is, each of the decoders in the first set may be configured to decode multiple texels in parallel from a single received block of texture data.

The decoder unit 200 is configured to decode a plurality of texels in accordance with a texel request. The decoder unit is capable of decoding up to $n_t$ texels concurrently, or in parallel, where $n_t=q.n+r.p$. The number of texels to be decoded in accordance with the texel request may be less than or equal to the number of texels capable of being decoded concurrently by the decoder unit 200. If the number of texels to be decoded in accordance with the texel request is greater than the value $n_t$, then the texels forming the request may need to be decoded in multiple passes. In this case, the control logic 210 may perform multiple allocation passes, where in each allocation pass the logic 210 allocates blocks of encoded texture data to the sets of decoders. If the number of texels forming part of the texture request is less than the value $n_t$, then in order to decode the plurality of texels indicated by the texel request, the decoder unit may decode a number of unwanted texels (i.e. texels not specified by the request). This may cause the decoder unit to consume unnecessary power. The control logic 210 is therefore configured to allocate blocks of encoded texture data to the decoders of the first and second sets in accordance with the texel request. The control logic may allocate the blocks of texture data to the decoders so as to minimise the number of texels decoded that are not part of the texel request. This may reduce unnecessary processing and thus potentially save power.

The plurality of texels to be decoded are encoded across one or more blocks of encoded texture data, where each block of encoded texture data encodes a block of texels for a texture. For conciseness, a block of encoded texture data (e.g. as shown at 106 and 110 in FIG. 1B) may be referred to herein as a data block, and a block as it refers to an arrangement of texels (e.g. blocks 104 and 108 shown in FIG. 1B) may be referred to as a texel block. The data block may be of a fixed size (i.e., number of bits) which is dependent on the texture compression format used to encode the texture data. The size of the block of texels encoded by each data block may also be dependent on the texture compression format.

A texel request could be a request from a texture pipeline unit of a graphics system, such as a GPU. The request could be made in response to the graphics system processing pixel data for one or more pixels to be rendered. In general, a request is an indication that a group of texels are to be decoded. Thus the request may group, or link, a plurality of texels into a set, and indicate that the texels in that set are to be decoded. The request could be in the form of an explicit instruction received by the decoder unit 200. For example, the instruction may specify that a group of texels are to be decoded (e.g. by specifying the coordinates of each of the texels in the group). Alternatively, the request could be in the form of an implicit instruction to decode a group of texels. For example, the request could contain an indication of one or more pixels being processed. The decoder unit 200 could then map each of the one or more pixels to a respective one or more texels of a texture so as to identify the texels to be decoded. The grouping of texels into a set as indicated by the request may be performed by the decoder unit 200 or some other part of the graphics system in which the decoder resides. That is, the decoder unit may receive the request that indicates a group of texels are to be decoded (either implicitly or explicitly). Alternatively, the decoder unit 200 may receive multiple sub-requests each indicating a single texel is to be decoded. The decoder unit 200 may then group those sub-requests into a single request indicating a group of texels are to be decoded.

Multiple texels may for example be grouped into a set for decoding by virtue of filtering stages performed by the graphics system to compute the texel colour to be applied to a pixel being processed. For instance, the graphics unit may perform bilinear filtering of texels, in which the texel colour to be applied to a single pixel is computed from an interpolation of a 2×2 block of texels. Thus the request could be an indication that a group of four texels are to be decoded. Some graphics units may additionally process more than one pixel concurrently. The processing of each pixel may require multiple texels to be decoded. For example, if the graphics unit processes four pixels concurrently, each of those pixels may require a separate block of four texels to be decoded for use in a filtering operation, leading to a request indicating that 16 texels are to be decoded. Of course, a request may indicate a different number of texels are to be decoded. The number of texels to be decoded in a request may vary as different pixels are being processed. That is, the number of texels indicated in the request may vary within a particular implementation within a graphics system as that graphics system as that system processes different pixels of the image to be rendered. Additionally, the number of texels indicated within a request may differ for implementations on different graphics systems. For example, the more pixels a graphics system is capable of processing in parallel, the higher the maximum number of texels indicated within a request may be.

The decoder unit 200 is arranged so that the decoders of the first set are capable of decoding a different number of texels concurrently from a single received data block than the decoders of the second set. More specifically, the decoders of the first set are capable of decoding more texels in parallel from a received data block than the decoders of the second set. It has been appreciated that the combination of decoders (i.e. the number of decoders in the first and second sets), and the configuration of the decoders (i.e. the number of texels the decoders of each set can decode in parallel) may be optimised so as to provide a decoder that benefits from increased hardware efficiency without suffering from a commensurate decrease in performance. This contrasts with conventional decoder arrangements, which typically include a set of decoders that each may each decode the same number of texels from a data block (e.g. a single texel).

To illustrate this, examples of more specific configurations of the decoder unit 200 will now be described. These example configurations have been determined to provide a potentially beneficial trade-off between hardware efficiency and performance using the recognition that the texels of common texel requests are often grouped into one or more sub-blocks of 2×2 texels. For example, in a request to decode 16 texels, those 16 texels may be grouped into four 2×2 sub-blocks. The 2×2 block is a common configuration for texel requests due to its use in a number of filtering operations such as bilinear filtering, tri-linear filtering and anisotropic filtering.

Because texel requests may often include a request for a 2×2 sub-block of texels to be decoded, it has been recognised that a convenient arrangement for the decoder unit 200 is for each of the decoders of the first set to be configured to decode four texels in parallel from a single received block of encoded texture data. If a particular sub-block of texels indicated by a request falls wholly within a texel block encoded by a data block (e.g. as indicated in FIG. 1A), then a decoder of the first set is capable of decoding all of the texels in that sub-block concurrently. Providing a multi-decoder capable of decoding four texels in parallel may offer improved hardware efficiency compared to operating four single-output decoders in parallel. This is due to the fact that multi-decoders can be made more hardware efficient than single decoders.

As described above with reference to FIGS. 1B and 1C, a texel sub-block indicated by a request may not always lie wholly within a block of texels encoded in a single encoded texture data block. The sub-block could for example overlap the edges of two adjacent texel blocks (as illustrated in FIG. 1B), or could overlap the corners of four adjacent, or contiguous texel blocks (as illustrated in FIG. 1C). In these cases, all the texels of the sub-block cannot be decoded in parallel using a single decoder, even if that decoder were a multi-output decoder. This is because in these cases the texel sub-block is not encoded within a single encoded texture data block, but instead is part encoded by two data blocks (in the example shown in FIG. 1B) or four data blocks (in the example shown in FIG. 1C) and a decoder operates on only a single encoded texture data block at a time. Thus two or four data blocks need to be decoded in order in a sequential manner to decode the texel sub-block indicated by a request in these cases.

A convenient approach to handle edge (FIG. 1b) and corner (FIG. 1c) cases is to arrange the decoder unit 200 so that the decoders of the second set are each capable of decoding a single texel only from a received data block (i.e. the decoders of the second set are single-output decoders). Though edge and corner cases may be handled by allocating each of the required data blocks to respective decoders of the first set, this is not an efficient use of the processing power of the decoder unit due to the fact that only a subset of the number of texels capable of being decoded by those decoders is needed from each decoder. For example, in the case a 2×2 texel sub-block overlaps the corners of four texel blocks, using four four-output decoders from the first set to decode these texels could provide an operating efficiency as low as 25% for those decoders.

In an alternative arrangement, each of the decoders of the second set may be provided as dual-output decoders. That is, each of the decoders of the second set may be configured to decode two texels in parallel from a single received data block. This arrangement may be particularly effective at handling cases in which a texel sub-block overlaps two adjacent texel blocks.

The number of decoders in each of the first and second sets may depend on the number (or maximum number) of texels that can be indicated within a given texel request for a given implementation of the decoder unit 200. Considering the example in which each request may contain an indication to decode up to 16 texels, it is appreciated that at least four four-output decoders are needed to be able to decode all of the texels indicated in the request concurrently. Of course, in certain instances four four-output decoders will be unable to decode 16 texels indicated in the request concurrently. This would be the case when the 16 texels were encoded across five or more data blocks (since four decoders can only texels from four data blocks concurrently). The statistical likelihood that 16 texels are encoded within four or fewer data blocks is dependent on the size of the texel blocks encoded by each data block, and the nature of the encoded texture data. The larger the size of the texel block encoded by a data block, the more likely it is that the 16 texels are encoded within four or fewer data blocks. Thus the decoder unit may benefit from having more than four four-output decoders in the first set in cases when the data blocks encode smaller texel blocks.

From a statistical analysis conducted on a dataset encoded according to the ASTC format, the inventors found that to decode 16 texels, the performance of five four-output decoders was approximately equal to the performance of the combination of four four-output decoders plus two single-output decoders, or four four-output decoders plus one dual-output decoder. However, the arrangement that includes the two single-output or single dual-output decoders has been recognised to provide increased flexibility. It is to be understood that this finding was based on an analysis of a single data set, and that for other types of data sets different combinations of decoder sets may be required to match the performance of a decoder unit having a single type of decoder. However, this analysis serves to illustrate how a similar performance to a decoder unit having one set of decoders can be achieved with a decoder unit containing multiple sets of decoders.

Thus, one convenient arrangement of the decoder unit 200 when decoding up to 16 unique texels indicated by a texel request may be to provide four four-output decoders in the first set of decoders 202; and either two single-output or one dual-output decoder in the second set of decoders 204. The use of four-output decoders may offer hardware savings compared to operating four single-output decoders in parallel, and thus the combination of four four-output decoder plus two single-output decoders (or one dual-output decoder) may offer a hardware saving compared to the conventional arrangement of operating 16 single-output decoders in parallel. Further, such an arrangement may not suffer a commensurate decrease in performance compared to the 16 single-output arrangement, as will be illustrated in more detail in the examples further below.

Of course, the maximum number of texels that may be indicated in a request may take values other than 16, and thus in general the decoder unit 200 may be arranged so that the ratio of the number of decoders in the first set to the number of decoders in the second set is 4:1 in the case that each decoder in the second set is a dual-output decoder; or 4:2 in the case that each decoder in the second set is a single-output decoder.

Figure 3:
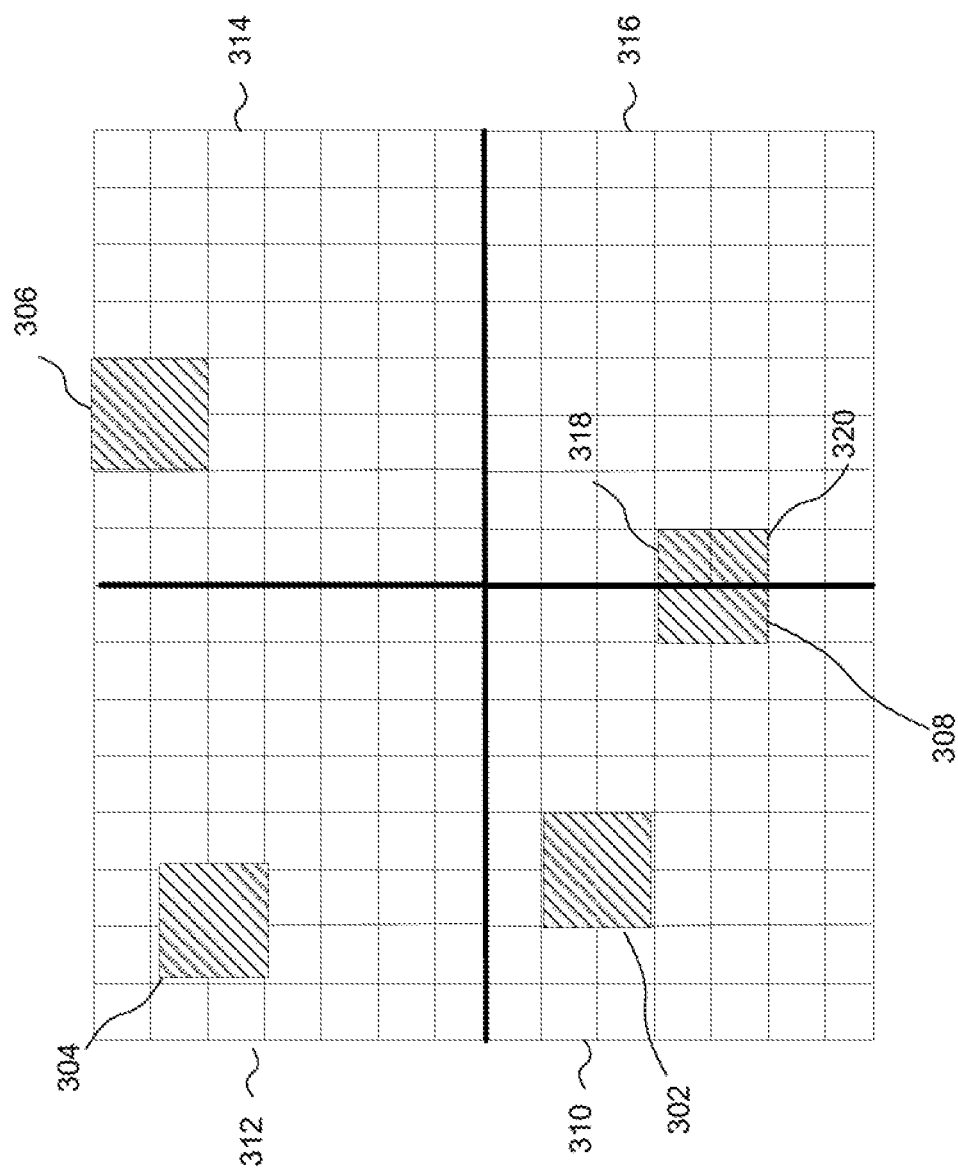
FIG. 3 illustrates how texels indicated in a texel request may be distributed across multiple texel blocks encoded by respective data blocks.

An example of how a decoder unit comprising four four-output decoders and two single output decoders operates to decode 16 unique texels indicated by a texel request is illustrated with respect to FIG. 3. FIG. 3 shows an example where the 16 texels indicated in the request are composed of four 2×2 texel sub-blocks, denoted 302, 304, 306 and 308. Texel blocks 310, 312, 314 and 316 represent the texels encoded within a respective data block, and are texel blocks of a wider texture (the rest of which is not shown in FIG. 3 for the purposes of clarity). Each texel block has dimensions of $n_b \times m_b$ texels which may be determined by the texture compression format used to encode the texture blocks into the respective data blocks. In this example, sub-blocks 302, 304 and 306 are located wholly within texel blocks 310, 312 and 314 respectively. Sub-block 308 overlaps the edges of adjacent texel blocks 310 and 316. Each texel block is shown here as an 8×8 block for illustration.

In response to the decoder unit 200 receiving the texel request indicating these 16 texels are to be decoded, the control logic 210 may allocate the data blocks for the sub-blocks wholly located within a texel block encoded within those data blocks to the four-output decoders of the first set 202. Thus, in this example, the data blocks for the sub-blocks 302, 304 and 306 are allocated to a respective four-output decoder of the first set.

For data blocks that are part-encoded by two or more different data blocks (such as sub-block 308), the control logic may allocate the texture data blocks encoding that sub-block to decoders of the first and second sets in dependence on the availability of the decoders within those sets. The control logic may allocate the data blocks to decoders in accordance with a priority scheme whereby the allocation of data blocks to decoders of the second set is prioritised over decoders of the first set when a texel sub-block is part encoded by those data blocks (e.g. in edge and corner cases). Thus in this example, the control logic may as a priority allocate an instance of the data block encoding texel 318 of sub-block 308 to a single-output decoder and another instance of that data block encoding texel 320 of sub-block 308 to a second single-output decoder. If there are only two single-output decoders (as in this example), the control logic may then allocate the data block encoding the two remaining texels of the sub-block 308 to an available four-output decoder of the first set (i.e., a data block different to the data block allocated to the single-output decoders). Alternatively, an allocation scheme could maintain queues for non-overlapping and overlapping sub-blocks, and associate with each queue a number of encoders for each set. The allocation scheme may maintain a separate queue for edge and corner overlapping texel sub-blocks.

In the case that a sub-block overlaps the corners of four adjacent texel blocks (i.e. each texel of the sub-block is encoded by a different respective data block), the control logic may allocate two different data blocks encoding two different texels of the sub-block to respective single-output decoders of the second set. The control logic may then allocate two further data blocks—each different to the data blocks allocated to the decoders of the second set—to respective decoders of the first set, where each data block allocated to the decoders of the first set encodes a different one of the remaining texels of the sub-block. Of course, other allocations are also possible.

In the above example, the decoder unit 200 comprising two single-output decoders and four four-output decoders is able to decoder the 16 unique texels indicated in the texel request concurrently, or in parallel. Moreover, the hardware requirements of the decoder unit may be less than operating 16 single-output decoders in parallel due to the improved hardware efficiency of the multi-output decoders. This example serves to illustrate how the decoder unit may decode a plurality of unique texels indicated in a request with improved hardware efficiency without a commensurate decrease in performance (in this particular example, without suffering any performance loss).

One texture compression format where the decoder unit 200 may be effective in obtaining a positive trade-off between hardware efficiency and performance is ASTC.

In ASTC, a compressed image, or texture, is subdivided into a plurality of data blocks, where each data block represents the texture data for a block of texels forming the texture. Each block of data has a fixed memory footprint (i.e. has a fixed size) of 128 bits. However, the data blocks are capable of representing the texture data for a varying number of texels; i.e. for texel blocks of varying sizes, or dimensions. The number of texels represented by a single data block may be referred to as the block footprint. The block footprint may be fixed for a given texture. The block footprint's height and width (in texels) are generally selectable from a number of predefined sizes, and the block's footprint need not be square. For 2-D textures, examples of block footprints include 4×4 texels; 6×6 texels; 8×8 texels and 12×12 texels (giving compression rates of 8 bits per pixel (bpp); 3.56 bpp; 2 bpp and 0.89 bpp respectively).

Figures 4A, 4B:
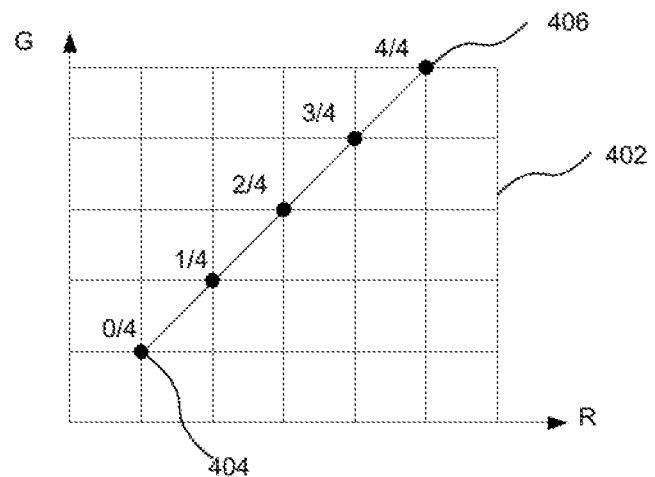
FIG. 4A shows two colour endpoint pairs located within an RG colour space.
FIG. 4B shows a 4 by 4 block of texels with a partition mask indicating the partition index of each texel and a weight grid indicating the weight for each texel.

The colour of each texel in within a block is defined as a point on a linear gradient between a pair of colours. This pair of colours is referred to as a pair of "colour endpoints". Colours for each texel can be calculated by interpolating between a pair of colour endpoints. An interpolant weight can be used to specify a weighted average of the two colour endpoints (i.e. the position on the linear gradient between those colour endpoints) to thereby define the colour for that texel. This process is illustrated schematically in FIG. 4A, which shows a pair of colour endpoints A (denoted 404) and B (denoted 406) in a red-green (RG) colour space denoted 402. In this example each texel can have one of five weights: 0/4 (corresponding to colour A); 1/4; 2/4; 3/4; or 4/4 (corresponding to colour B). An example of the texel weights for each texel of a 4 by 4 block is shown in FIG. 4B. Though shown for the simple example of an RG colour space, the same approach is applied when working in different colour spaces such as RGB or RGBα.

Each colour endpoint may be composed of one or more colour values. A colour endpoint may be composed of up to a maximum of four colour values. When decoding a texel, colour values are decoded from the data block and those values are then converted into colour endpoints. The way colour values are converted into colour endpoints is defined by a parameter known as the colour endpoint mode. Information on the colour endpoint mode for a texel is encoded within the data block. The ASTC specification defines 16 possible colour endpoint modes, which vary from computing a colour endpoint from a single colour value up to computing a colour endpoint from four colour values.

The interpolant weights may be stored in the form of a weight grid, which is a 2-D grid of weight values corresponding to the block of texels represented in the data block. In certain encodings, an interpolant weight may be stored for each texel in the data block (i.e. the dimensions of the weigh grid correspond to the dimensions of the block footprint). However, for data blocks that represent texture data for a larger number of texels (e.g. 12×12 texels), there may not be enough data within the block to store an interpolant weight for each texel. In this case, a sparser weight grid may be stored that contains fewer weights than the number of texels within each data block. An interpolation weight for each texel in the data block can then be calculated from an interpolation of this sparser weight grid.

In order to do this, the coordinates of a texel within the block are first scaled to the dimensions of the weight grid. The coordinates are scaled by a scale factor that scales the dimensions of the weight grid to the dimensions of the block footprint. The re-scaled position of the texel with respect to the weight grid is then used to select a subset of weights of the weight grid and to interpolate those to calculate a weight for the texel. For example, four weights from the weight grid may be selected and interpolated to calculate the weight for a texel.

In certain cases, a single pair of colour endpoints can be used to calculate the colour for each texel within a data block. However, in other cases, a block may represent texels which have a mixture of different colours that cannot reasonably be represented by interpolating between a single pair of colour endpoints. To get around this problem, each texel in the data block can be assigned to one of up to four partitions, where each partition is associated with its own colour endpoint pair. To determine the colour of a texel within the block, the partition that the texel belongs to is determined and the colour calculated from the interpolant weight for that texel and the colour end point pairs associated with the partition. The interpolant weight can be stored and encoded within the data block independently of the colour end point pair (i.e. independently of the partition to which the texel belongs).

Figure 4C:
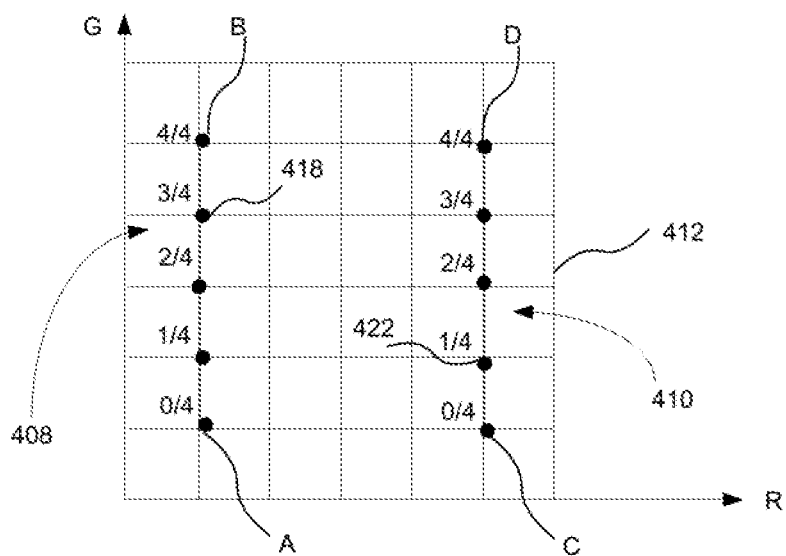
FIG. 4C shows a first colour endpoint pair 408 formed of endpoint colours A and B, and a second colour endpoint pair 410 formed of endpoint colours C and D within an RG colour space 412.
Figure 4D:
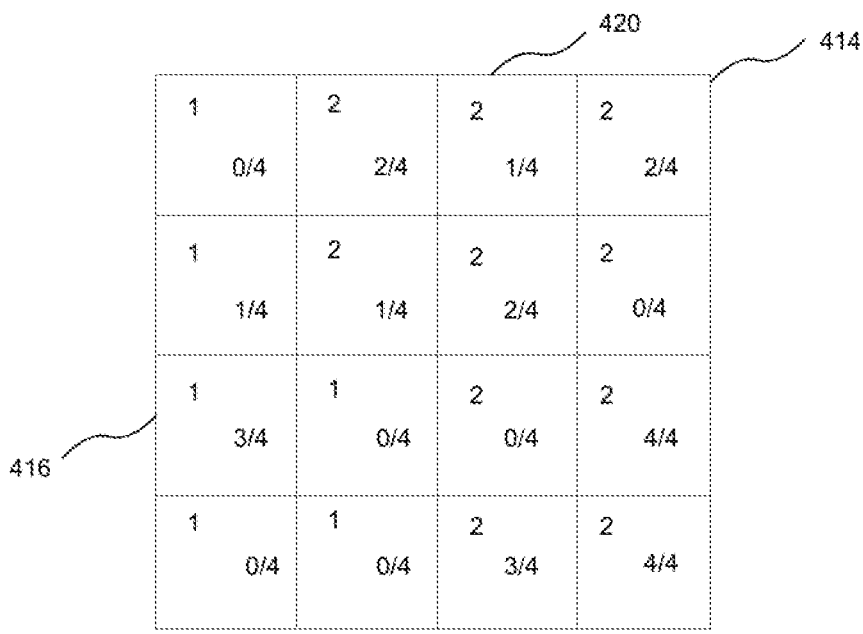
FIG. 4D shows a block of texels 414 represented by a block of texture data.

This is illustrated schematically in FIGS. 4C and 4D. FIG. 4C shows a first colour endpoint pair 408 formed of endpoint colours A and B, and a second colour endpoint pair 410 formed of endpoint colours C and D within an RG colour space 412. The first endpoint pair belongs to a first partition and the second endpoint pair belongs to a second partition. Thus in this example there are two partitions. Each colour endpoint pair can be interpolated between with five weights. FIG. 4D shows a block of texels 414 represented by a block of texture data. A partitioning mask is shown overlaid on the block of texels indicating which partition each texel belongs to. The partitioning mask is a grid of values, where each value indicates which partition a texel belongs to. Each value may as such be referred to as a partition index. In particular, a value of 1 indicates a texel belongs to the first partition (associated with colour endpoint pair 408); and a value of 2 indicates a texel belongs to the second partition (associated with colour endpoint pair 410). The weights for each texel are also shown. To determine the colour for a texel, the partition index is used to identify the colour endpoint pair, and the weight is used to interpolate between that pair. For example, texel 416 has a partition index of 1, and a weight of 3/4 and thus has a colour defined by the position 418 in RG colour space. Texel 420 has a partition index of 2 and a weight of 1/4 and so has a colour defined by the position 422 in RG colour space.

As described above, the size of the texel block encoded by a data block (i.e. the block footprint for ASTC encoding) impacts the likelihood that a particular 2×2 block of texels indicated in a request falls wholly within a texel block. On the assumption that each texel is equally likely to be requested, it can be shown that for a texel block size 4×4, the chance of a 2×2 sub-block falling wholly within the texel block is 56% (9/16), whereas for a 12×12 texel block, that likelihood increases to about 77% (111/114). The average likelihood that a 2×2 texel sub-block falls completely within a texel block encoded by a data block (that is, averaged over each of the possible block footprints supported by the ASTC specification) is 72%. Using this, and an analysis of the number of unique cache lines required to decode 16 unique texels in accordance with an OpenGL 2 test from GLBenchmark v2.7, the inventors have estimated that, on average, four four-output decoders operating to decode 16 unique texels achieves approximately 75% of the performance of 16 single-output decoders operating in parallel. The inventors have used the results of the OpenGL test to estimate the performance of the decoder when decoding ASTC-encoded data on the recognition that the size of a cache line (128 bits) is the same as an ASTC data block, and thus the number of unique cache lines required to decode 16 unique texels is expected to give a reasonable estimate of the number of unique ASTC data blocks required to decode 16 unique texels.

A further analysis shows that adding a fifth four-output decoder would improve the performance of the decoder unit to approximately 89% of 16 single-output decoders in parallel. However, it has been found that at least a similar level of performance can be obtained by including two single-output decoders or a single dual-output decoder instead of the fifth four-output decoder, whilst benefiting from improved hardware requirements.

A third single-output decoder could also be added to the decoders of the second set to improve the handling of corner cases, but for 8×8 texel blocks (which roughly equates to the average texel block size supported by ASTC), a 2×2 texel sub-block overlaps the corners of four texel blocks in only 1/64 cases (1.56%). From this it is concluded that the inclusion of a third single-output decoder to the second set does not provide a beneficial trade-off between performance and hardware requirements.

Based on the above, the inventors have found that for ASTC-encoded textures, a decoder unit configured to decode 16 unique texels indicated in a texel request that comprises four four-output decoders and either two single-output decoders or a single dual-output decoder may achieve approximately 90% of the performance of 16 single-output decoders operating in parallel.

Of course, if the maximum number of unique texels indicated within a texel request is not 16, a different number of decoders in the first and second sets may be provided. For example, if the graphics system of which the decoder unit 200 may be part operates to process 8 texels concurrently, then a texel request may be expected to indicate up to 32 unique texels are to be decoded. In this case, the decoder unit may comprise eight four-output decoders in the first set and either four single-output decoders or two dual-output decoders in the second set. In general, a decoder with a ratio of 4:1 between the number of four-output decoders of the first set and dual-output decoders of the second set; or 4:2 between the number of four-output decoders of the first set and single-output decoders of the second set may be able to decode up to m unique texels indicated in a texel request with a performance of approximately 90% of m single-output ASTC decoders operating in parallel. In addition, the provision of the multi-output decoders in the first set may mean that the overall hardware requirements of the decoder unit may be less than them single-output decoders operating in parallel.

Figure 5:
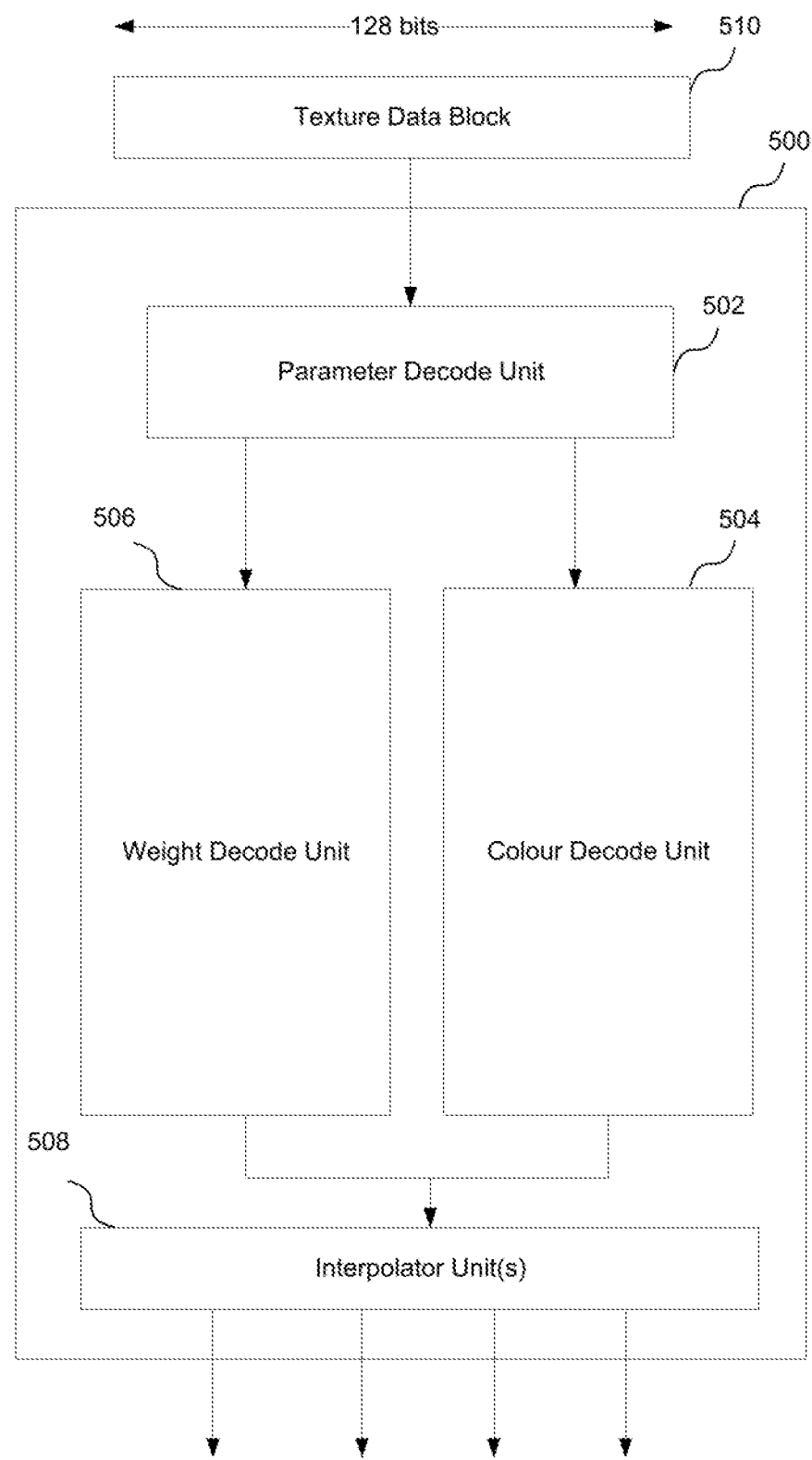
FIG. 5 shows an example of a multi-output ASTC decoder for use in the first and potentially second set of decoders of the decoder unit shown in FIG. 2.

An example of a multi-output ASTC decoder that may offer improved hardware efficiency compared to an equivalent number of single-output decoders operating in parallel is shown in FIG. 5. The decoder 500 shown in FIG. 5 is an example of a decoder of the first set of decoders 202, or the second set of decoders 204 (in the case that the decoders of the second set are not single-output decoders).

The decoder comprises a parameter decode unit 502, a colour decode unit 504, a weight decode unit 506 and at least one interpolator unit 508. The parameter decode unit is coupled to the colour decode unit and the weight decode unit. In particular, an output of the parameter decode unit is coupled to an input of both the weight decode unit and colour decode unit. Each of the colour decode unit and the weight decode unit are coupled to the at least one interpolator unit. More specifically, an output of the weight and colour decode units is coupled to an input of the interpolator unit(s).

The decoder 500 is configured to receive as an input a block of ASTC-encoded texture data, shown at 510. The decoder may be allocated the data block from the control logic 210. As mentioned above, the block has a size, or memory footprint, of 128 bits. The texture data block 510 encodes texel colours for an $n_b \times m_b$ block of texels. That $n_b \times m_b$ block of texels may form part of a compressed image, or texture. The texture may be composed of a plurality of such texture blocks, with each of those blocks being encoded in a respective 128-bit data block. The dimensions of the block (i.e. the values of $n_b$ and $m_b$) are selectable from a number of fixed alternatives specified by the ASTC standard.

The decoder 500 operates to decode a plurality of texels from the texture block 510. The maximum number of texels that the decoder can decode from the block 510 is denoted $n_t$, where $n_t$ could for example be 2 or 4. The decoder may decode the plurality of texels in parallel. The decoder may for instance comprise a plurality of outputs for outputting a respective decoded texel. The decoder may operate to decode the plurality of texels according to a decoding process. That decoding process may comprise a series of decoding steps, or operations. The series of steps undergone to decode a particular texel may be referred to as a decoding pipeline. Thus, the decoder 500 may operate to decode a plurality of texels from block 510, where each texel is decoded according to the decoding pipeline. As will be appreciated from the following, the decoder 500 may be capable of decoding any number of texels from the block 510. That is, $2 \leq n_t \leq n_b \cdot m_b$.

In the following example, for the purposes of illustration the block of texture data 510 encodes the texel block 310 (shown in FIG. 3), and the decoder 500 operates to decode the 2 by 2 sub-block of texels 302 (i.e. $n_t=4$). Of course, the decoder is capable of decoding any $n_t$ texels from a block, whether arranged in a sub-block or not. The texture data represented by the data block may be partitioned into a plurality of partitions.

The parameter decode unit 502 receives the data block 510. The parameter decode unit operates to decode configuration data for the block 510. The configuration data may be data that specifies parameters of the texture data and its encoding within the block 510. The configuration data could include, for example: the size of the weight grid and/or the range of the weight values; an indication of whether the texture data is single plane or dual plane; the partition count (i.e. the number of partitions for the data block 510) and the colour endpoint modes.

The colour decode unit 504 decodes colour endpoint data for each of the $n_t$ texels being decoded from the block 510 using the configuration data decoded from the data block 510. The colour endpoint data includes a pair of colour endpoints for each of the texels being decoded. If the block of data has a partition count of one, then each of the texels being decoded is associated with the same colour endpoint pair. The colour endpoint data may include up to eight colour endpoints, forming four colour endpoint pairs (for a partition count of four). One or more of the colour endpoints may be associated with multiple texels of the group of texels being decoded from the data block 510; i.e. some of the texels being decoded may share a common colour endpoint, or common colour endpoint pair. For example, if more than four texels are being decoded in parallel from the data block 510, at least two of those texels will share a common colour endpoint or colour endpoint pair because the ASTC standard limits the number of partitions to a maximum of four (and thus the number of colour endpoint pairs is limited to a maximum of four).

The weight decode unit 506 decodes interpolation weight data for each of the $n_t$ texels being decoded from the block 510 using the configuration data decoded by the parameter decode unit 502. The interpolation weight data for a given texel could be a single weight (e.g. if the texture data in the block is single plane) or a pair of weights (e.g. if the texture data in the block is dual-plane). Thus the weight decode unit may decode a weight for each texel being decoded from the block 510, or a pair of weights for each texel being decoded from the block 510. These weight values are received by the interpolation unit(s) 508.

The interpolation unit(s) 508 calculate a colour value for each of the texels $n_t$ being decoded using the colour endpoint data for each texel and the weight value for each texel.

The decoder 500 may then output the decoded colour values for each of the $n_t$ texels. That is, the decoder may output $n_t$ texel colour values. These may be outputted in parallel.

Figure 6:
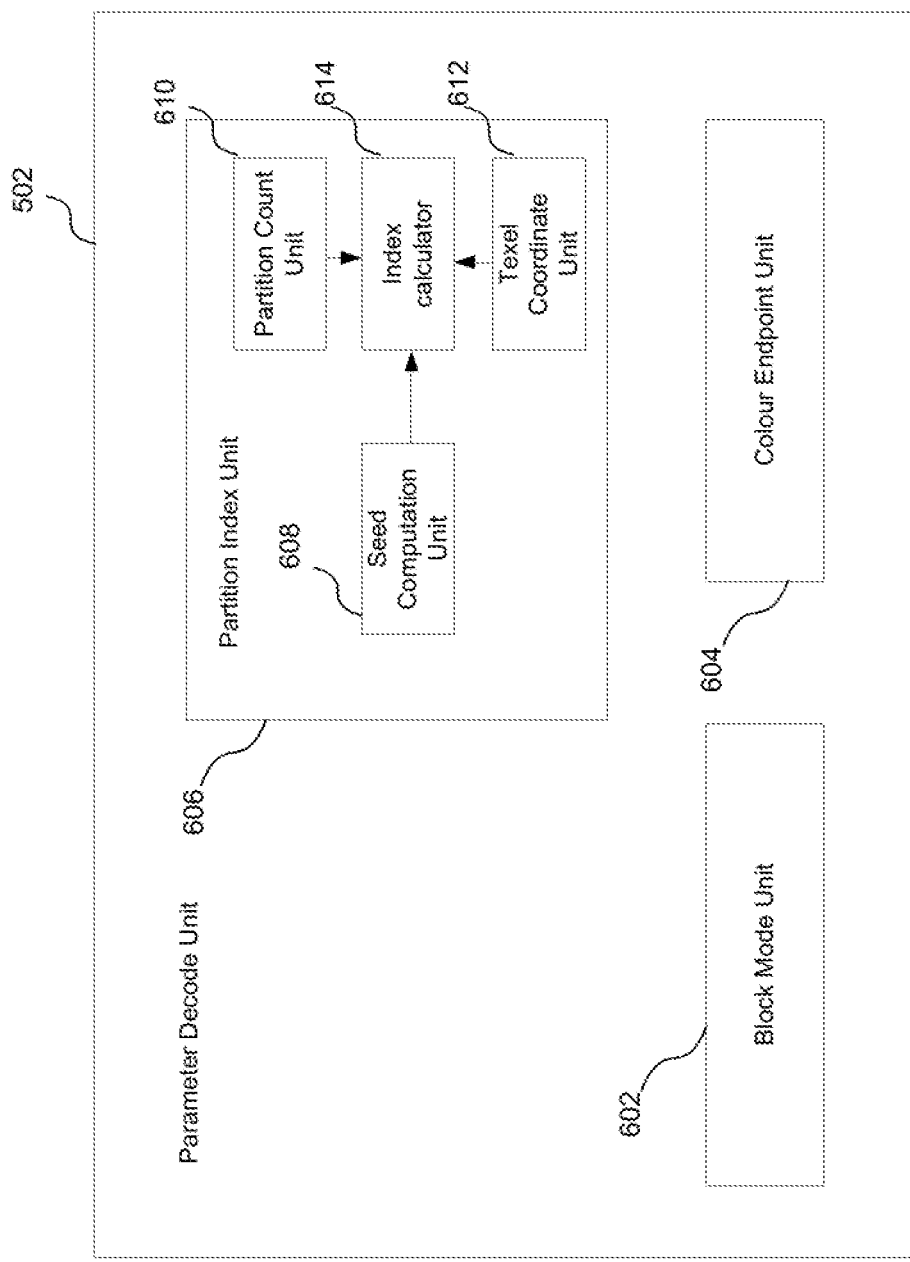
FIG. 6 shows an example structure of a parameter decode unit forming part of the decoder shown in FIG. 5.

An example of the parameter decode unit 502 is shown in more detail in FIG. 6. As shown, the parameter decode unit 502 comprises a block mode unit 602; a colour endpoint unit 604 and a partition index unit 606.

The block mode unit 602 is configured to decode a portion of the configuration data including the weight grid size (its height and width, i.e. its dimensions) and the range of weight values that can be occupied by the weights of the weight grid.

The partition index unit 606 is configured to calculate a partition index for each of the texels to be decoded from the block 510 (in this example, the texels of block 302). The partition index identifies which partition each texel belongs to, and is an example of a configuration parameter.

The partition index for each texel is computed from a seed, the partition count and the coordinate of the texel within the block 602. The seed, partition count and texel coordinates may be referred to as intermediate configuration data since they are examples of data that are used in order to decode a configuration parameter (the partition index), but are themselves not configuration parameters. The partition count is decoded from the data block 510 by a partition count unit 610 that forms part of the partition index unit 606. The seed is computed by a seed computation block 608 from a partition pattern index decoded from the data block 510. The coordinates of the texels are computed by a texel coordinate unit (TCU) 612. The TCU 612 may comprise hardware for calculating the coordinates of each of the texels of block 302 in parallel. The partition index unit comprises an index calculator 614 for calculating the partition index from the seed, partition count and texel coordinates. The index calculator calculates a partition index for each of the texels of block 302 being decoded.

The colour endpoint unit 604 is configured to decode the colour endpoint modes from the data block 510. In the case that the texture data has a partition count greater than one (i.e. there are multiple partitions), the colour endpoint unit may decode the colour endpoint mode for each partition. As described above, the colour endpoint modes specify how colour values decoded from the block 510 are to be converted into colour endpoints. In general, the ASTC specification specifies 16 possible colour endpoint modes, where the modes require differing numbers of colour values to form a colour endpoint. In particular, four of the modes form a single colour endpoint from a single colour value (luminance), and thus require two colour values for each colour endpoint pair; four of the modes form a single colour endpoint from two colour values and thus require four colour values for each colour endpoint pair; four of the modes require three colour values to form each colour endpoint, and thus require 6 colour values for each colour endpoint pair; and four of the modes require four colour values to form a single colour endpoint (RGBα), and thus require 8 colour values for each colour endpoint pair.

A portion of the configuration data decoded and/or calculated by the parameter decode unit 502 is independent of the texels being decoded from the data block 510. That is, a portion of the configuration data for the block 510 is the same regardless of the texels being decoded from that block; i.e. a portion of the configuration data is common to the decoding of each of the texels of the block. The portion of configuration data is therefore common to the decoding of each of the plurality of texels being decoded from the texture data block. This data can be said to be specified per data block, rather than per texel. In some cases, this portion of 'per-data-block' configuration data may form a substantial portion of the configuration data.

Conveniently, this per-block configuration data decoded by the parameter decode unit may be used by the colour decode unit 604 and weight decode unit 606 as part of the decoding process for each of the texels in block 302 being decoded. A first subset, or portion of the per-block configuration data may be used by the colour decode unit and a second subset, or portion, of the per-block configuration data may be used by the weight decode unit. That is, the colour decode unit may use a first portion of the per-block configuration data to decode the endpoint data for all the texels in block 302; and the weight decode unit may use a second portion of the per-block configuration data to decode the interpolation weight data for all the texels in block 302. This means that the parameter decode unit need not decode the per-block configuration data $n_t$ times when the decoder 500 is to decode $n_t$ texels from the block in parallel. Instead, the parameter decode unit 502 only decodes the per-block configuration data once when the decoder 502 decodes $n_t$ texels in parallel from the block 510. This in turn means the parameter decode unit 502 does not need hardware to decode the per-block configuration data $n_t$ times in parallel, leading to potential hardware savings.

In this particular example, the weight grid size and the range of weight values are examples of configuration data that are common to the decoding of the texels in the block 510, and thus these same configuration parameters are used in the decoding of each of the texels in block 302. Thus the block mode unit 602 is formed of substantially the same hardware as if the decoder 500 were only a single-output decoder. Put another way, the block mode unit 602 can be shared across, or used as part of, the decoding pipelines for each of the texels to be decoded from the block 510.

The colour endpoint mode data decoded by the colour endpoint unit 604 is also independent of the texels being decoded from the block 510. Thus the same colour endpoint mode data decoded by this unit is used in the decoding of each of the texels in block 302. In other words, this data is shared across the decoding pipelines for each of the texels being decoded.

With respect to the partition index unit 606, both the partition count and the seed (generated from the partition pattern index decoded from the data block 510) are per-m block parameters independent of the texels being decoded. Thus the same seed and decoded partition count can be used in the calculation of the partition index for each of the texels in block 302, and so the seed computation unit 608 and the partition count unit 610 can be shared across the decoding pipelines for each of these texels being decoded.

The hardware resources of the parameter decode unit 502 can therefore be reduced compared to a multi-decoder formed from a plurality of conventional ASTC decoders operating in parallel.

Figure 7:
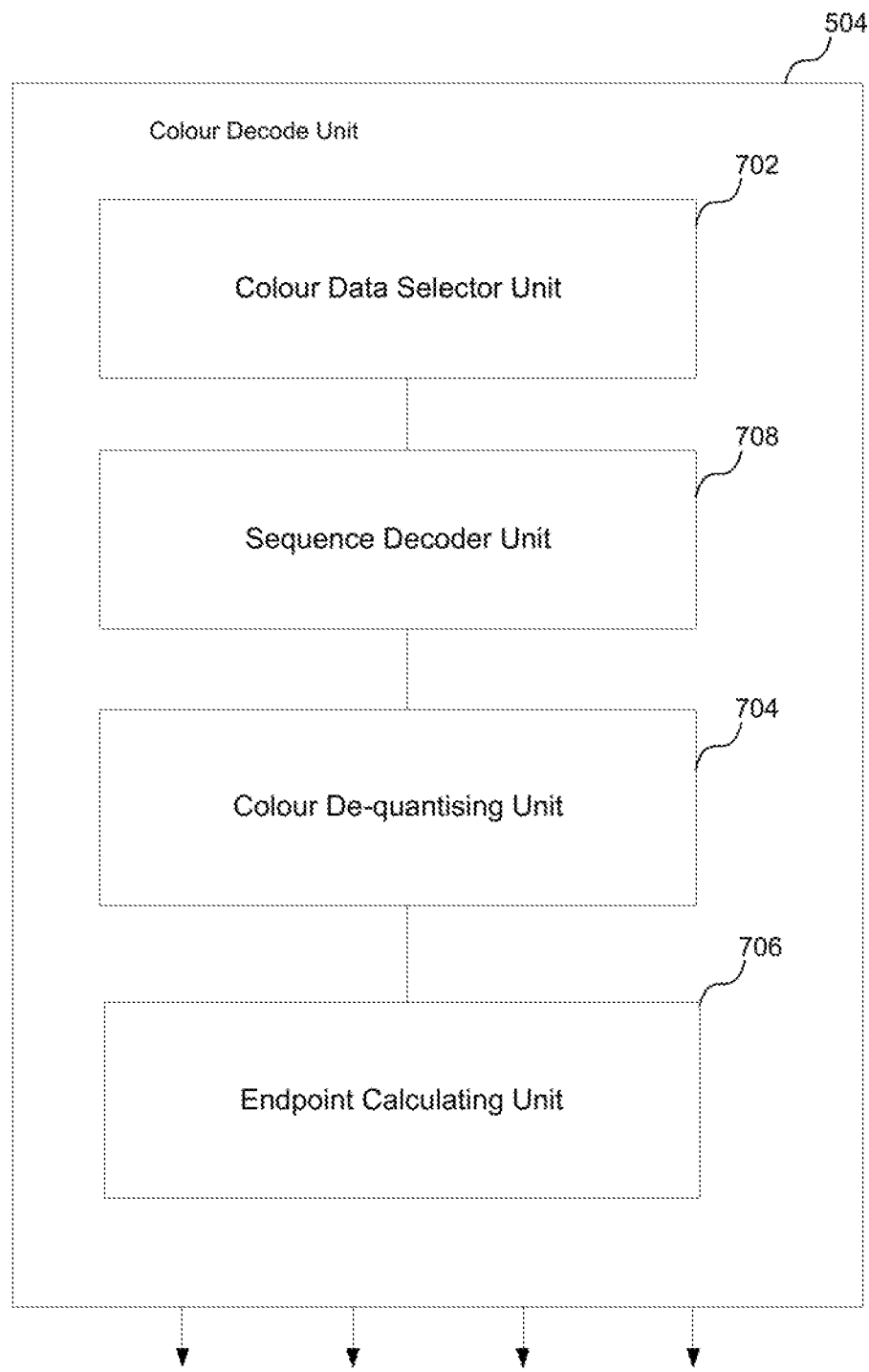
FIG. 7 shows an example structure of a colour decode unit forming part of the decoder shown in FIG. 5.

An example structure of the colour decode unit 504 is shown in FIG. 7. The colour decode unit comprises a colour data selector unit (CDSU) 702, a sequence decoder unit 708, a colour de-quantising unit 704 and a colour endpoint calculation unit 706.

The CDSU 702 is configured to determine the size of the colour data within the data block 510, i.e. the size of the data within the block used to represent the colour endpoints). In ASTC, the colour data is encoded within a data block as a variable length bit string. The colour data is encoded according to a bounded integer sequence encoding (BISE) scheme.

The size of the colour data can be determined from the partition count (decoded by the partition count unit 610) and the block mode data decoded by the block mode unit 602. Thus, the CDSU 702 determines the size of the colour data using only a portion of the configuration data that is independent of the texels being decoded from the block 510. The CDSU 702 may also decode the location of the colour data within the data block. This information may again be determined from the partition count and the block mode data.

As described above, the partition count and the block mode data are parameters specified per-block of data and are common to the decoding of all the texels encoded in block 510. Thus the colour decode unit 504 can use that portion of configuration data as part of the decoding for each of the texels in sub-block 302. In particular, the CDSU 702 can perform a single determination of the colour data size within the block 510 and that determination can then be used as part of the decoding pipeline for each of the texels in sub-block 302.

The sequence decoder unit 708 is configured to perform integer sequence decoding of the colour data. As mentioned above, the colour data is encoded within a data block according to a binary integer sequence encoding (BISE) scheme. The use of the BISE scheme enables colour values to be encoded in a fractional number of bits. A sequence of values can be represented using trits (base-3 representation) or quints (base-5 representation). Other base representations may also be used.

The colour de-quantising unit 704 is configured to extract the colour values from the decoded colour data and to de-quantise those colour values. De-quantising means restoring the encoded colour values to their original range (e.g. [0, 1, . . . 255]). In certain cases, each of the texels of sub-block 302 being decoded in parallel by the decoder 500 could be in a different partition, in which case eight colour end points may be needed (two colour end points per partition). If each of these partitions were also associated with a colour endpoint mode in which each colour endpoint was formed from four colour values, this would require 32 colour values to be extracted and dequantised from the data block 510. However, the ASTC specification limits the number of colour values that may be encoded within a 128-bit data block to 18.

In order for the multi-decoder to be able to best accommodate the above situation, the colour de-quantising unit 704 may be configured to (or have the appropriate hardware to be able to) extract and de-quantise 18 colour values from the data block 510 in parallel. It will be noted that because it is not possible to decode 32 colour values from the data block 510, certain colour endpoint modes for partitioned data (e.g. data with a partition count of 3 or 4) are not possible.

The endpoint calculation unit 706 is configured to convert the de-quantised colour values decoded by the de-quantising unit 704 into a set of colour endpoints. The endpoint calculation unit 706 may calculate the set of colour endpoints using the partition index and associated colour endpoint mode for each of the texels in block 302 to be decoded. If more than four texels are to be decoded (for example, if 10 texels are to be decoded), then there will be a redundancy in partition indices and associated colour endpoint modes for those texels (because a block of data can only have a maximum of four partitions). Thus to reduce the amount of computations, the endpoint calculation unit may convert the colour values into the set of colour endpoints using the set of partition indices (and associated colour endpoint modes)

spanned by the texels to be decoded. The de-quantising unit 704 may receive this information from the partition index unit 606 and the colour endpoint unit 604.

The endpoint calculation unit may output a pair of colour endpoints for each texel being decoded from the block 510. To do this, the endpoint calculation unit 706 may select an endpoint pair from the set of colour endpoints using the partition index for each texel being decoded. Alternatively, it may output the colour endpoints for each partition and a partition index for each texel.

Like the parameter decode unit 502, the colour decode unit 504 is configured to decode data from the block 510 that is independent of the texels being decoded. That is, the colour decode unit 504 is configured to decode data common to all the texels encoded in data block 510 as part of decoding the colour endpoint data for the texels in sub-block 302. The colour decode unit 504 uses that same data to decode the colour endpoint data for all of the texels in sub-block 302 being decoded. That is, the same per-block data decoded by the colour decode unit 504 is used in the decoding pipeline of each of the texels in sub-block 302.

For instance, the size and location of the colour data within the data block 510 as decoded by the CDSU 702 is a parameter specified on a per-block level and is independent of which texels are being decoded from the data block. This data may be referred to as intermediate colour data, since it is data decoded from that block that is used to decode the colour endpoint data output from the colour decode unit. Because this intermediate data is independent of the texels being decoded, it is used by the remainder of the colour decode unit 504 when decoding the endpoint data for each of the texels in sub-block 302 being decoded from the data block 510. That is, the intermediate colour data is common to the decoding of each texel from the data block 510. By only calculating this data once and re-using it as part of the decoding pipeline for each of the texels being decoded, the hardware requirements of the CDSU 702 can be made substantially the same as for a single-output ASTC decoder.

The colour values decoded by sequence decoder unit 708 and dequantized by the colour de-quantising unit 704 may be partially shared across the decoding pipelines of all the texels in sub-block 302. For example, ASTC limits the number of colour values that may be stored within the data block 310 to 18. When decoding a single texel from the data block 510, up to eight colour values are needed (up to four colour values per colour endpoint, for two colour endpoints forming a single colour endpoint pair). Thus, when decoding a single texel, eight colour values may be BISE decoded and dequantized. When the decoder is decoding more than (18/8) texels in parallel (i.e., when the decoder decodes three or more texels in parallel), all 18 colour values may be BISE decoded and de-quantised. However, because the number of colour values being BISE decoded and dequantized is less than the multiple of the number of texels being decoded in parallel and the number of colour values needed per texel, the BISE decoded and dequantized colour values are partially shared across the decoding pipelines of the texels. In other words, in some cases the BISE decoded colour data is at least partially shared amongst the decoding pipelines of the texels being decoded in parallel from the data block. Similarly, the dequantized colour values are in some cases at least partially shared amongst the decoding pipelines of the texels being decoded. In other words, the BISE decoded and dequantized colour data may be common to at least some of the texels being decoded in parallel from the block 310. The BISE decoded colour data and dequantized colour values may also therefore be examples of common intermediate data.

More generally, when the number of colour values decoded from the data block (denoted nv), is less than the number of partitions multiplied by the number of colour values in a colour endpoint pair (denoted 2.np.ncv, where np=the partition number and ncv=the number of colour values to form a single colour endpoint), then a subset of the decoded and dequantized colour values may be converted to colour endpoints shared by a plurality of the texels being decoded (even if those texels belong to different partitions).

Figure 8:
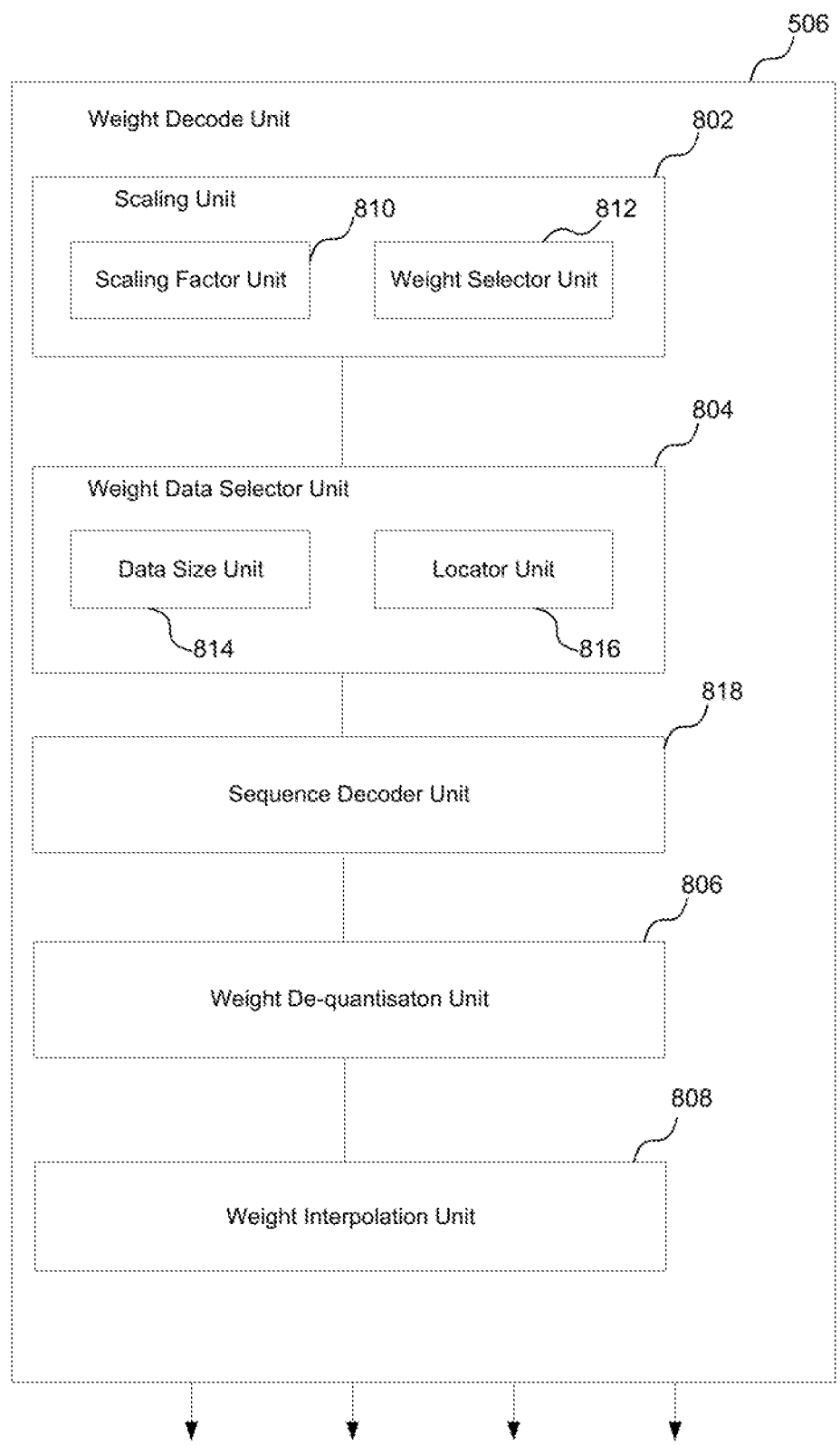
FIG. 8 shows an example structure of a weight decode unit forming part of the decoder shown in FIG. 5.

FIG. 8 shows an example internal structure for the weight decode unit 506. Here, the weight decode unit comprises a scaling unit 802; a weight data selector unit (WDSU) 804; a sequence decoder unit 818 a weight de-quantisation unit 806 and a weight interpolation unit 808. The scaling unit 802 is coupled to the WDSU 804; the WDSU is coupled to the de-quantising unit 806 and the de-quantising unit is coupled to the weight interpolation unit 808.

The scaling unit 802 is configured to identify weights of the weight grid to be used in an interpolation so as to generate a weight for each of the texels in the sub-block 302. The scaling unit 802 may identify a set of weights from the weight grid for each texel being decoded. Each set of weights can then be interpolated to generate a final weight for each texel.

As described above, depending on the size of the block footprint a weight may not be explicitly stored for each texel represented by the data block. For larger block footprints (e.g. 12 by 12 texels), the weight grid is of a sparser resolution than the block dimensions. In such cases, in order to derive a weight for each texel, the texel's coordinates are scaled to the dimensions of the weight grid and then a weight interpolation is performed for each texel in order to calculate a weight for those texels.

The scaling unit 802 comprises a scaling factor unit 810 and a weight selector unit 812. The scaling factor unit 810 decodes the scaling factor that scales the size of the weight grid to the size of the block footprint from the data block 510. The weight selector unit 812 uses the scaling factor to scale the coordinates of each of the texels in the sub-block 302 being decoded to the weight grid and to select weights of the weight grid to be used in an interpolation for each of the texels in sub-block 302 to calculate a weight for those texels. The same scale factor as calculated by scale factor unit 810 is used by the weight selector unit 812 to scale the coordinates of each of the texels in sub-block 302. Thus the scaling factor can be used to calculate the weights for each of the texels in that sub-block.

Figure 9:
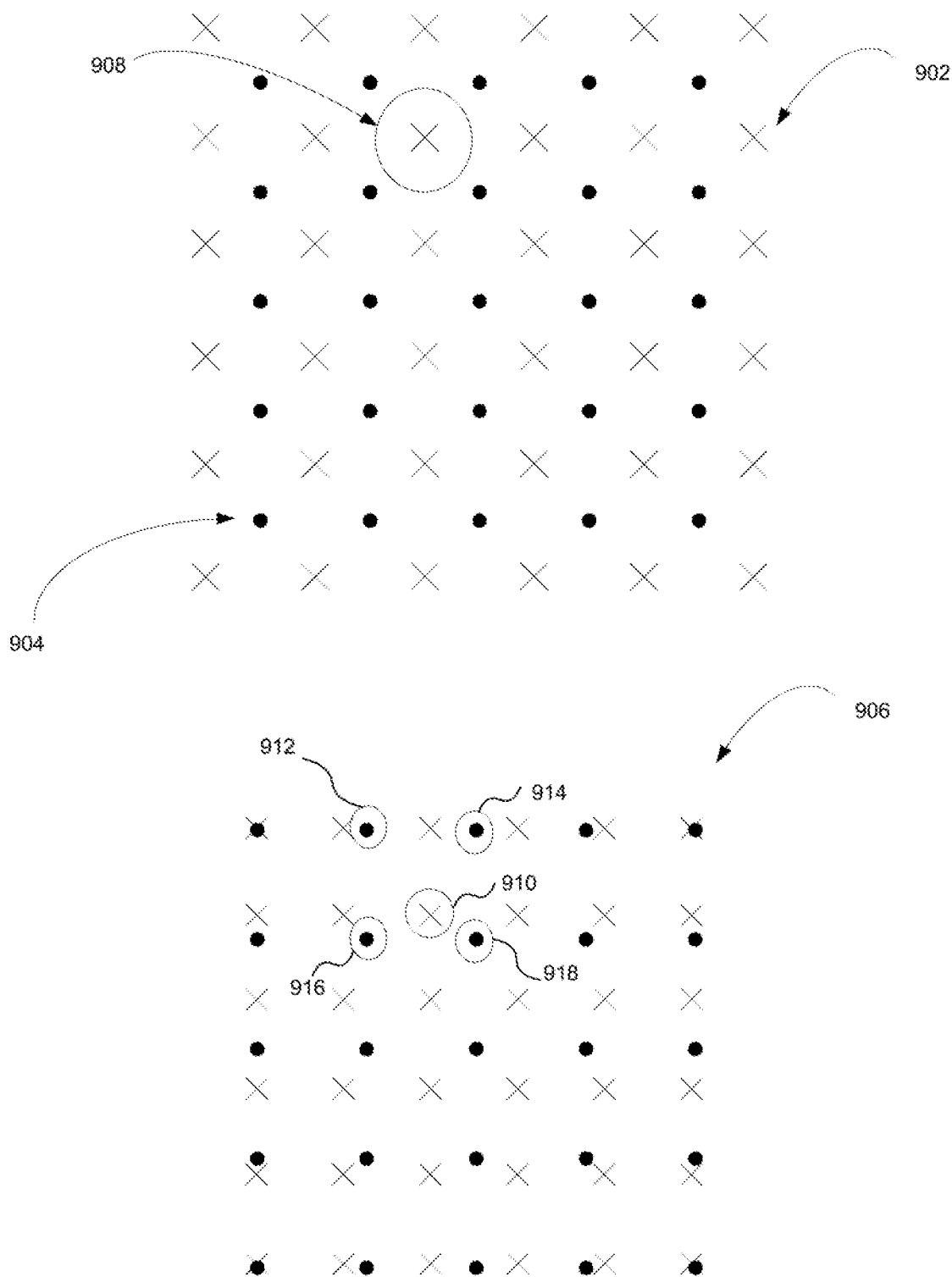
FIG. 9 shows an illustration of how coordinates of a texel within a block can be rescaled to the dimensions of a weight grid.

This process is illustrated schematically in FIG. 9. A 6 by 6 block footprint of texels is shown by the 'cross' markings (denoted generally at 902) and a 5 by 5 weight grid is shown by the 'dot' markings and denoted generally at 904. The weight grid is therefore of a lower resolution than the dimensions of the block footprint. The block footprint and the weight grid are shown overlapped with each other for the purposes of illustration. A scaling factor is then applied to the coordinates of the texels to re-scale the block footprint to the dimensions of the weight grid. The result of applying this scale factor is shown generally at 906. In this example the scaling factor has been applied to all the texels in the block footprint (rather than just the selected texels being decoded) for the purposes of illustration. The re-scaled texel coordinates are then used to select a set of weights of the weight grid to interpolate in order to calculate a weight for each texel. For example, the coordinates of texel A (circled for identification) are re-scaled from position 908 to position 910. The set of weights 912, 914, 916 and 918 are then selected for interpolation to generate a final weight for texel A using the re-scaled position of that texel with respect to the weight grid.

The weight data selector unit 804 determines the size of the weight data within the block and the location of the data for the selected weights of the weight grid to be used in the interpolation for all of the texels in the sub-block 302 being decoded.

The WDSU comprises a weight data size unit 814 and a weight locator unit 816. The data size unit 814 is configured to determine the size of the weight data within the block 510. The data size unit 814 determines this based on the weight value ranges and the size of the weight grid as decoded by the block mode unit 602. The size of the weight data within the block 510 is used as part of the weight data decode for all the texels in sub-block 302 being decoded.

The weight locator unit 816 is configured to locate the weight data within the block 510 for each set of weights to be used in the weight interpolation for each of the texels in sub-block 302. That is, the weight locator unit 816 may separately locate the weight data within the block to be used in the weight interpolation for each texel being decoded. It may locate this weight data for each texel in parallel.

Like the colour data, the weight data may also be BISE encoded. The sequence decoder unit 818 is configured to perform binary integer sequence decoding of the weight data.

The weight de-quantization unit 806 is configured to de-quantise the decoded set of weights for each of the texels in the sub-block 302 (that is, return each of the weights to their original range from their encoded range). The set of weights for each of the texels being decoded are independent of each other, and thus the de-quantization unit may comprise hardware to de-quantise the weight sets for each of the texels being decoded in parallel.

The weight interpolation unit 808 is configured to interpolate the set of weights for each texel being decoded to calculate for each of those texels final interpolation weight data (e.g. a final interpolation weight per plane for each texel being decoded). The weight interpolation unit may calculate the final interpolation weight data for each texel being decoded from the block 510 in parallel.

The interpolation weight data for each of the texels in sub-block 302 being decoded is then output from the weight decode unit 506.

Like the parameter decode unit 502 and the colour decode unit 504, the weight decode unit 506 decodes data from the block 510 that is common to the decoding of all texels from the block 510. Thus the weight decode unit decodes per-block data (i.e. data specified on a per-block basis) as part of decoding the interpolation weight data. This data may be referred to as intermediate weight data, since it is data decoded from the data block 510 and used to decode the final interpolation weight data output by the weight decode unit. The weight decode unit uses the same per-block (intermediate) data to decode the interpolation weight data for all of the texels in sub-block 302. That is, the per-block data decoded by the weight decode unit is re-used in the decoding pipeline of each of the texels in sub-block 302. This advantageously enables the components that decode this data to be shared amongst the decoding pipelines for each of the texels being decoded from the block.

For instance, the scaling factor that scales the dimensions of the block footprint to the weight grid as decoded by the scale factor unit 810 is a parameter specified per data block and is independent of the texels being decoded. Thus the same scale factor can be used by the weight selector unit 812 to scale the coordinates of each of the texels in sub-block 302. Thus the scale factor unit may have substantially the same hardware requirements as if the decoder 500 were a single-output decoder.

Similarly, the size of the weight data within the block 510 is also a parameter that is independent of the texels being decoded. Thus the size of the weight data as decoded by the weight data size unit 814 is used by the weight locator unit 816 to locate the weight data for all of the texels in sub-block being decoded. Thus the data size unit 814 may also have substantially the same hardware requirements as if the decoder 500 were a single-output decoder.

Referring back to FIG. 5, the at least one interpolator unit 508 is configured to calculate a colour value for each of the texels in sub-block 302 being decoded using the interpolant weight data for that texel and a pair of colour endpoints from the colour endpoint data. The interpolator unit(s) may calculate a final colour for each texel being decoded from the interpolant weight data for that texel output from the weight decode unit 506 and the colour endpoint pair for that texel output from the colour decode unit 504. The final colour values may be specified with respect to an RGBα colour space (i.e. each decoded colour may be in RGBα format).

The interpolator unit(s) 508 may calculate the colour for each texel by using the interpolant weight for that texel to interpolate between the associated colour endpoint pair.

The interpolator unit(s) 508 may be configured to calculate the final texel colours for each of the texels being decoded in parallel. The number of interpolator units 508 may be equal to the partition number of the texture data being decoded. Alternatively, the number of interpolator units may be equal to the number of texels being decoded from the data block 510.

The decoder 500 described above is a multi-output decoder that can decode multiple texels from a block of texture data compressed according to the ASTC specification. As in the examples above, the decoder can operate to decode the plurality of texels in parallel. However, advantageously, the decoder 500 can use certain portions of the data decoded from the texture data block as part of the decoding process for all of the texels being decoded from that data block. Thus multiple texels can be decoded from the block in parallel without requiring parallel processing for each stage of the decoding process. This means the decoder 500 can have reduced hardware requirements (e.g. have a reduced area if implemented on an integrated circuit) compared to operating multiple conventional ASTC single-decoders in parallel. In particular, the inventors have found that by implementing the multiple output decoder in the manner described above to decode four texels, the chip area can be reduced to approximately 2.37 times the chip area of a conventional single-output ASTC decoder, approximately equivalent to two thirds of the area of four single decoders. In other words, the four-output decoder described above can save approximately 40% of the chip area compared to four single-output decoders operating in parallel. This transpires into chip area savings of approximately 25% for a decoder unit 200 containing four four-output decoders 500 and two single-output decoders, compared to an arrangement of 16 single-output decoders.

The above example illustrates how a decoder unit configured to decode m texels in accordance with a texel request that have been ASTC encoded may achieve on average 90% of the performance of m single-output decoders operating in parallel whilst saving up to approximately 25% of the chip area.

The term "performance" as used herein was determined by calculating how many cycles it would take the hybrid decoder unit to process all m requested texels versus a decoder unit that had m single decoders, for a sample set of requests. Since the m single decoder system always processes each request in 1 cycle, the number of cycles taken by the hybrid decoder can be compared to provide a comparison of a performance metric.

Though the above example has been described with reference to ASTC encoding, it will be appreciated that this is merely for the purposes of illustration and that the decoder units described herein could be configured to decode texels encoded according to some other encoding scheme, such as for example: PVRTC; PVRTC2; ETC1; ETC2; EAC; S3TC; 3Dc; or BC1-BC5. Each of these compression schemes encodes texture data for a block of texels into data blocks, and thus a decoder configured in accordance with the examples herein that decodes texture data encoded by one of these schemes may benefit from an improved performance-to-hardware requirement tradeoff.

Furthermore, though the examples described above referred to a decoder unit containing a first and second set of decoders, it will be appreciated that other combinations of decoder sets are possible. For example, the decoder unit may contain: a first set of one or more decoders, each decoder being configured to decode n texels in parallel from a single received block of texture data; a second set of one or more decoders, each decoder in the second set being configured to decode p texels from a single received block of texture data; and a third set of one or more decoders, each decoder in the third set being configured to decode s texels from a single received block of texture data, where s<p<n. For example, n=4, p=2 and s=1. I.e., each decoder in the third set may be a single-output decoder. The numbers of decoders in the first set to the second set and third set may be in the ratio 4:2:2; 4:1:1; 4:1:2; 4:2:1 etc. In other arrangements, the decoder unit may comprise a plurality of decoder sets, where the decoders of each set are configured to decode different numbers of texels in parallel from a received texture data block. Each decoder set may contain only a single decoder.

The control logic as described herein may be configured to allocate blocks of encoded texture data to the decoders in accordance with the texel request and an allocation scheme. The allocation scheme may also depend on the relative positioning of the texels to be decoded within the texel blocks (i.e. the number of texture data blocks used to encode the texels of the request). The lower the number of texture data blocks in which the requested texels are encoded, the greater the priority may be given to multi-output decoders. The allocation scheme may follow a set of prioritised allocations. The allocation scheme may include only allocating an encoded texture block to a multi-output decoder (e.g. a decoder in the first set) if the requested texel sub-block contains multiple texels within a block of texels encoded by that encoded texture data block. If a texel sub-block contains only a single texel within each texel block, then the allocation scheme may specify that the encoded texture blocks encoding those texel blocks are allocated to a single-output decoder. A general allocation scheme may be as follows: first, determine whether any texel block encoded by a respective texture data block contains more than one request texel, and if so, allocate those texture data blocks to one or more multiple-output decoders as necessary, or to the decoders of the set capable of decoding the greatest numbers of texels in parallel. Remaining texels of the texture request can then be decoded by allocating the appropriate texture data blocks to decoders of the set can only decode fewer texels in parallel. Of course, other allocation schemes can be used as appropriate.

Figure 10:
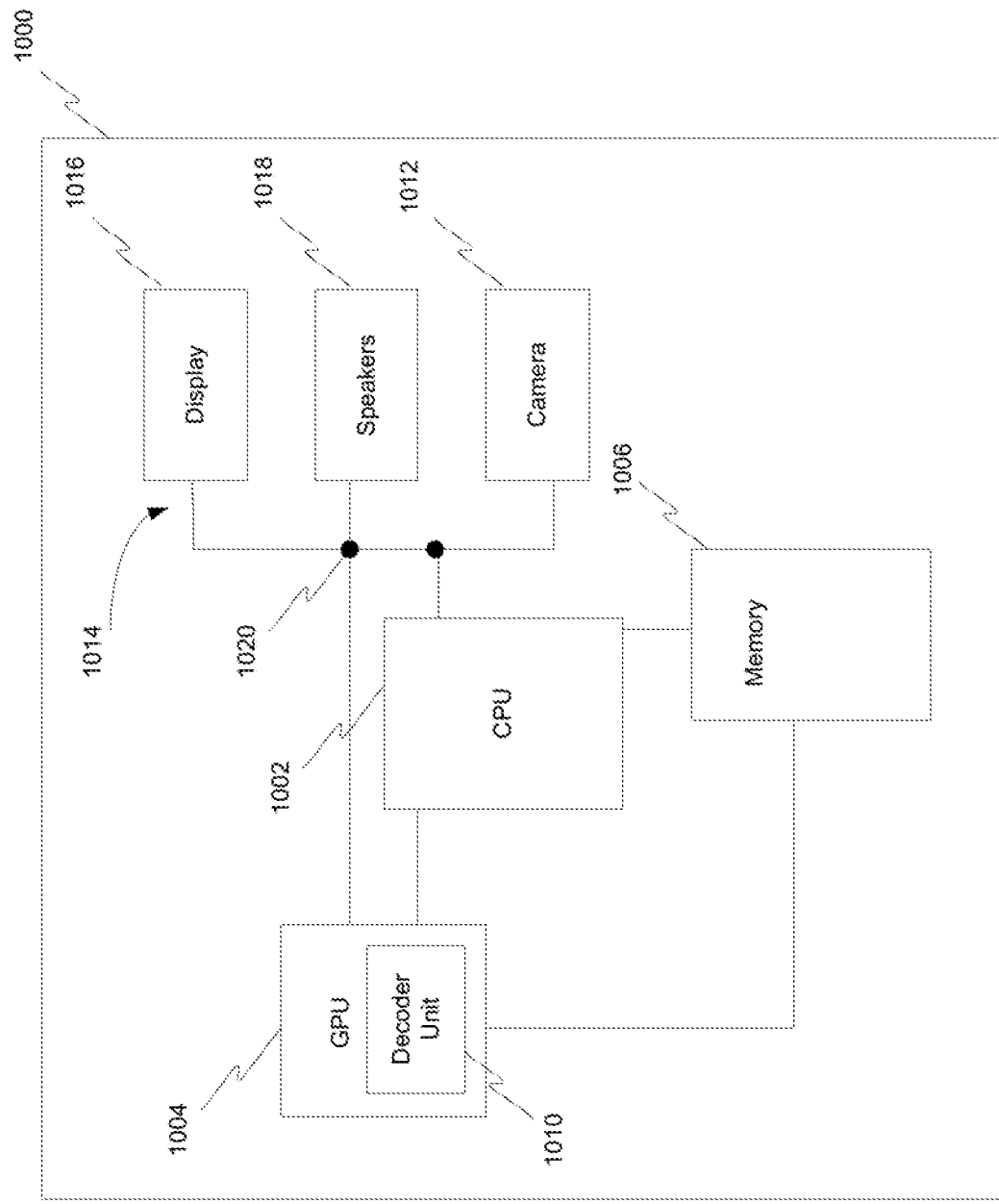
FIG. 10 shows a computer system in which the decoder unit may be implemented.

FIG. 10 shows a computer system 1000 in which the decoder units described herein may be implemented. The computer system comprises a CPU 1002, a GPU 1004, a memory 1006 and other devices 1014, such as a display 1016, speakers 1018 and a camera 1012. A decoder unit 1010 is implemented on the GPU 1004. In other examples, the decoder unit 1010 may be implemented on the CPU 1002. The components of the computer system can communicate with each other via a communications bus 1020.

The decoder units of FIGS. 5-8 are shown as comprising a number of functional blocks, or units. This is schematic only and is not intended to define a strict division between different logic elements of such entities. Each functional block may be provided in any suitable manner. It is to be understood that intermediate values described herein as being formed by a unit, or block, need not be physically generated by the unit/block at any point and may merely represent logical values which conveniently describe the processing performed by the unit/block between its input and output.

The decoder units described herein may be embodied in hardware on an integrated circuit. The decoder units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a decoder unit configured to perform any of the methods described herein, or to manufacture a unit comprising any apparatus described herein. An integrated circuit definition dataset may be, for example, an integrated circuit description.

Therefore, there may be provided a method of manufacturing, at an integrated circuit manufacturing system, a decoder unit as described herein. Furthermore, there may be provided an integrated circuit definition dataset that, when processed in an integrated circuit manufacturing system, causes the method of manufacturing a decoder unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a decoder unit will now be described with respect to FIG. 11.

Figure 11:
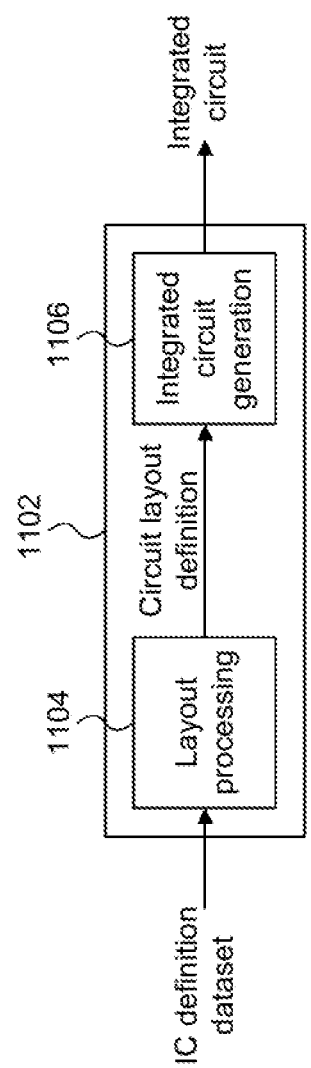
FIG. 11 shows an example of an integrated circuit manufacturing system.

FIG. 11 shows an example of an integrated circuit (IC) manufacturing system 1102 which is configured to manufacture a decoder unit as described in any of the examples herein. In particular, the IC manufacturing system 1102 comprises a layout processing system 1104 and an integrated circuit generation system 1106. The IC manufacturing system 1102 is configured to receive an IC definition dataset (e.g. defining a decoder as described in any of the examples herein), process the IC definition dataset, and generate an IC according to the IC definition dataset (e.g. which embodies a decoder unit as described in any of the examples herein). The processing of the IC definition dataset configures the IC manufacturing system 1102 to manufacture an integrated circuit embodying a decoder as described in any of the examples herein.

The layout processing system 1104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1104 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a decoder unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A decoder unit embodied in hardware and configured to decode a plurality of texels in accordance with a texel request, the plurality of texels being encoded across one or more blocks of encoded texture data each encoding a block of texels, the decoder unit comprising:
  a first set of one or more decoders, each of the first set of decoders being configured to decode n texels from a single received block of encoded texture data;
  a second set of one or more decoders, each of the second set of decoders being configured to decode p texels from a single received block of encoded texture data, where 1≤p<n; and
  control logic configured to allocate different blocks of encoded texture data to the decoders in accordance with the texel request, wherein the control logic is configured to, in response to a texel request indicating a 2×2 sub-block of texels encoded across more than one block of encoded texture data is to be decoded, allocate an instance of at least one block of encoded texture data to each of two decoders of the second set, each of said more than one blocks of encoded texture data encoding at least one texel of the 2×2 sub-block.

2. The decoder unit as claimed in claim 1, wherein each of the second set of one or more decoders is configured to decode a single texel from a received block of encoded texture data.

3. The decoder unit as claimed in claim 1, wherein each of the one or more second set of decoders is configured to decode two texels from a received block of encoded texture data.

4. The decoder unit as claimed in claim 1, wherein each of the first set of decoders is configured to decode four texels from a single received block of encoded texture data.

5. The decoder unit as claimed in claim 1, wherein the control logic is configured to allocate an instance of one block of encoded texture data that encodes two texels of the 2×2 sub-block to each of two decoders of the second set in response to the texel request indicating the 2×2 sub-block overlaps the edges of two adjacent texel blocks.

6. The decoder unit as claimed in claim 1, wherein the control logic is configured to allocate two different blocks of encoded texture data encoding two different texels of the 2×2 sub-block to two decoders of the first set in response to the texel request indicating the 2×2 block overlaps the corners of four adjacent texel blocks.

7. The decoder unit as claimed in claim 1, wherein the control logic is configured to allocate a block of encoded data different to the blocks allocated to the decoders of the second set to a decoder of the first set that encodes at least one other texel of the 2×2 sub-block.

8. The decoder unit as claimed in claim 1, wherein each encoded block of texture data is encoded according to an Adaptable Scalable Texture Compression (ASTC) format.

9. The decoder unit as claimed in claim 8, wherein each of the first set of decoders comprises:
  a parameter decode unit configured to decode configuration data for the received block of texture data;
  a colour decode unit configured to decode colour endpoint data for n texels of the received block in dependence on the configuration data;
  a weight decode unit configured to decode interpolation weight data for each of the n texels of the received block in dependence on the configuration data; and
  at least one interpolator unit configured to calculate a colour value for each of the n texels of the received block using the interpolation weight data for that texel and a pair of colour endpoints from the colour endpoint data;
  wherein at least one of the parameter decode unit, colour decode unit and weight decode unit are configured to decode intermediate data from the received block that is common to the decoding of the texels of that block and to use that decoded intermediate data in the decoding of at least two of the n texels from the received block of texture data.

10. The decoder unit as claimed in claim 9, wherein the at least one of the parameter decode unit, colour decode unit and weight decode unit are configured to use the same data as part of the decoding of each of the n texels.

11. The decoder unit as claimed in claim 10, wherein the colour decode unit is configured to: decode intermediate colour data from the received block of texture data as part of decoding the colour endpoint data that is common to the decoding of the texels of that block; and use that intermediate colour data to decode the colour endpoint data for each of the n texels.

12. The decoder unit as claimed in claim 9, wherein a first portion of the configuration data is common to the decoding of the n texels, and the weight decode unit is configured to use that first portion of configuration data for decoding the interpolation weight data for each of the n texels, the first portion of configuration data comprises at least one of: a weight grid size specifying the dimensions of a weight grid; and weight ranges specifying the range of values occupied by weights of the grid.

13. The decoder unit as claimed in claim 9, wherein a second portion of the configuration data is common to the decoding of the texels of the received block, and the colour decode unit is configured to use that second portion of configuration data for decoding the colour endpoint data for each of the n texels.

14. The decoder unit as claimed in claim 12, wherein the second portion of configuration data comprises colour endpoint mode data that specifies how to convert a set of colour endpoint values into a pair of colour endpoints.

15. The decoder unit as claimed in claim 9, wherein the parameter decode unit is configured to: decode intermediate configuration data from the received block of texture data as part of decoding the configuration data; and use that same intermediate configuration data to decode a partition index for each of the n texels.

16. The decoder unit as claimed in claim 9, wherein the weight decode unit is configured to: decode intermediate weight data from the received block of texture data as part of decoding the interpolation weight data that is common to the texels of that block; and use that data to decode the interpolation weight data for each of the n texels, wherein the intermediate data comprises the size of the data within the block used to represent the interpolation weight data.

17. The decoder unit as claimed in claim 9, wherein the texels represented by the block are partitioned into $n_p$ partitions, and the decoder comprises $n_p$ interpolators each configured to calculate a colour value for a subset of texels in a respective partition using the interpolation weight data for that texel and a respective pair of colour endpoints from the colour endpoint data.

18. The decoder unit as claimed in claim 1, wherein the blocks of texture data are encoded according to one of the following texture compression formats: S3TC; PVR-TC; PVR-TC2; ASTC; ETC1; ETC2; EAC; 3Dc; and BC1-BC5.

19. A method of decoding a plurality of texels in accordance with a texel request using a decoder unit embodied in hardware, the texels being encoded across one or more blocks of encoded texture data each encoding a block of texels, the method comprising:

allocating blocks of encoded texture data to decoders of a first and second set of one or more decoders in accordance with the texel request, wherein each of the first set of decoders is configured to decode n texels from a single received block of encoded texture data, and each of the second set of decoders is configured to decode p texels from a single received block of encoded texture data, where $1 \leq p < n$; and wherein, in response to a texel request indicating a 2×2 sub-block of texels encoded across more than one block of encoded texture data is to be decoded, an instance of at least one block of encoded texture data is allocated to each of two decoders of the second set, each of said more than one blocks of encoded texture data encoding at least one texel of the 2×2 sub-block.

20. An integrated circuit definition dataset that, when processed in an integrated circuit manufacturing system, configures the integrated circuit manufacturing system to manufacture a decoder unit embodied in hardware and configured to decode a plurality of texels in accordance with a texel request, the plurality of texels being encoded across one or more blocks of encoded texture data each encoding a block of texels, the decoder unit comprising:

a first set of one or more decoders, each of the first set of decoders being configured to decode n texels from a single received block of encoded texture data;

a second set of one or more decoders, each of the second set of decoders being configured to decode p texels from a single received block of encoded texture data, where $1 \leq p < n$; and control logic configured to allocate different blocks of encoded texture data to the decoders in accordance with the texel request, wherein the control logic is configured to, in response to a texel request indicating a 2×2 sub-block of texels encoded across more than one block of encoded texture data is to be decoded, allocate an instance of at least one block of encoded texture data to each of two decoders of the second set, each of said more than one blocks of encoded texture data encoding at least one texel of the 2×2 sub-block.

* * * * *